Dec. 27, 1966   V. WOUK ETAL   3,295,048
CAPACITOR MEANS FOR CONTROLLING THE CONDUCTION OF
UNIDIRECTIONAL SWITCHING DEVICES
IN A POWER SUPPLY
Filed May 22, 1961                          8 Sheets-Sheet 1

INVENTORS
Victor Wouk
Eliasz Poss

BY William Grobman
Lawrence I. Field
ATTORNEYS

Dec. 27, 1966     V. WOUK ETAL     3,295,048
CAPACITOR MEANS FOR CONTROLLING THE CONDUCTION OF
UNIDIRECTIONAL SWITCHING DEVICES
IN A POWER SUPPLY
Filed May 22, 1961     8 Sheets-Sheet 2

INVENTORS
Victor Wouk
Eliasz Poss

BY William Grobman
Lawrence I. Field

ATTORNEYS

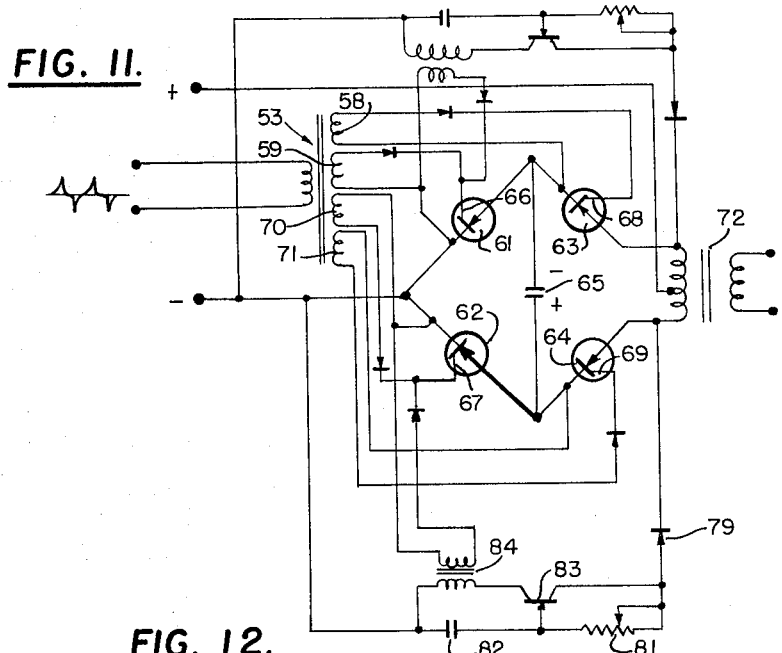

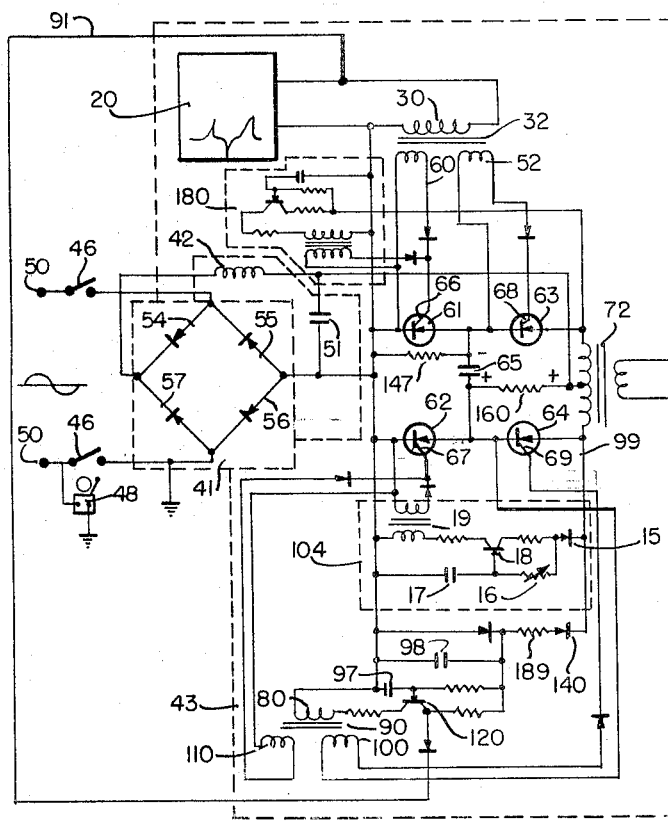

Dec. 27, 1966 V. WOUK ETAL 3,295,048
CAPACITOR MEANS FOR CONTROLLING THE CONDUCTION OF
UNIDIRECTIONAL SWITCHING DEVICES
IN A POWER SUPPLY
Filed May 22, 1961 8 Sheets-Sheet 5
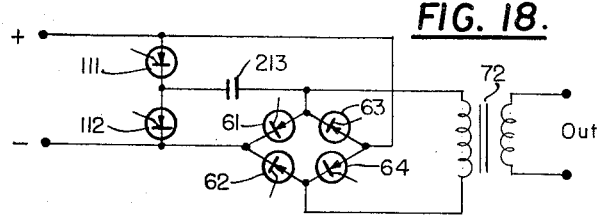
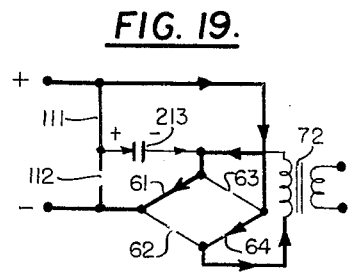
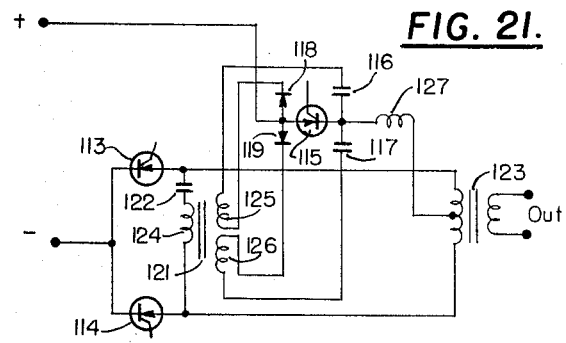
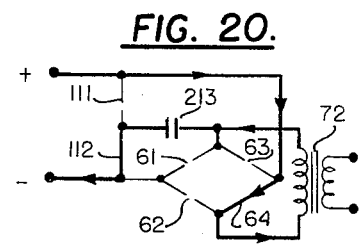
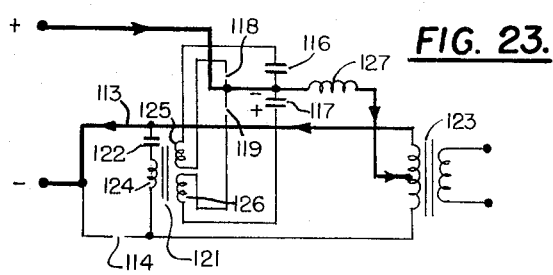
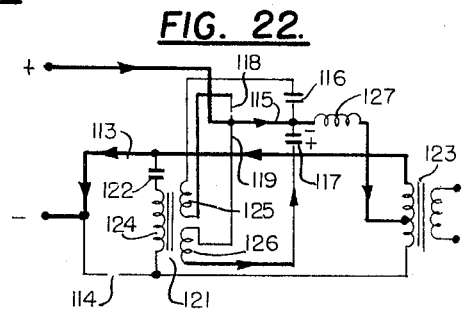
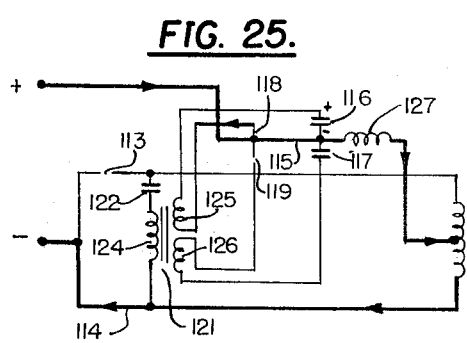
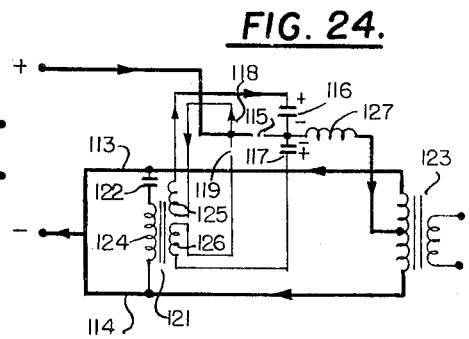
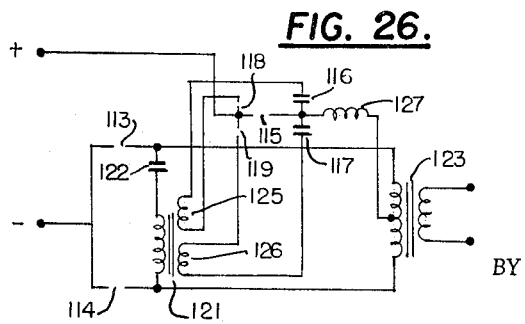
INVENTORS
Victor Wouk
Eliasz Poss
BY William Grobman
Lawrence I Field
ATTORNEYS Dec. 27, 1966   V. WOUK ETAL   3,295,048
CAPACITOR MEANS FOR CONTROLLING THE CONDUCTION OF
UNIDIRECTIONAL SWITCHING DEVICES
IN A POWER SUPPLY
Filed May 22, 1961                     8 Sheets-Sheet 6
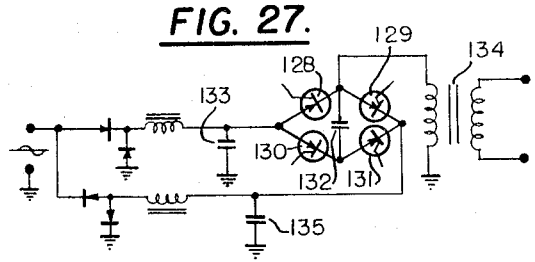
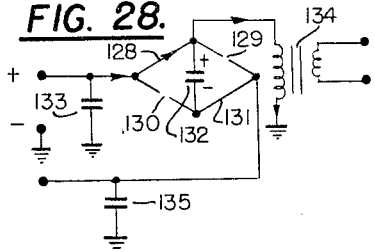
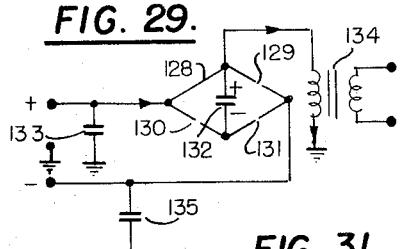
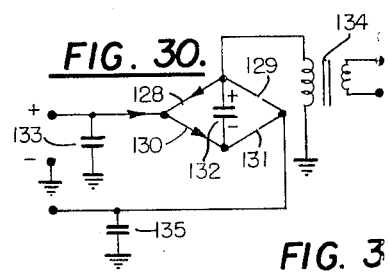
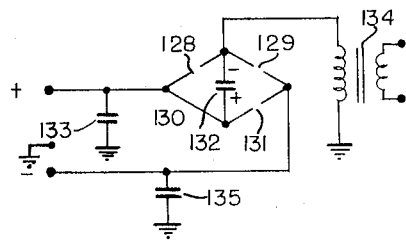
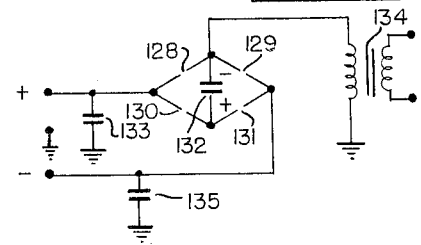
INVENTORS
Victor Wouk
Eliasz Poss
BY
ATTORNEYS Dec. 27, 1966     V. WOUK ET AL     3,295,048
CAPACITOR MEANS FOR CONTROLLING THE CONDUCTION OF
UNIDIRECTIONAL SWITCHING DEVICES
IN A POWER SUPPLY
Filed May 22, 1961                        8 Sheets-Sheet 7

INVENTORS
Victor Wouk
Eliasz Poss

BY William Krohman
Lawrence Field
ATTORNEYS

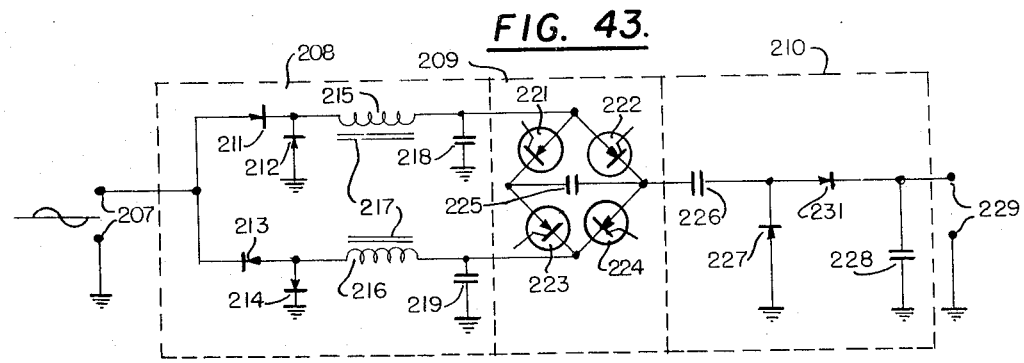
FIG. 43.
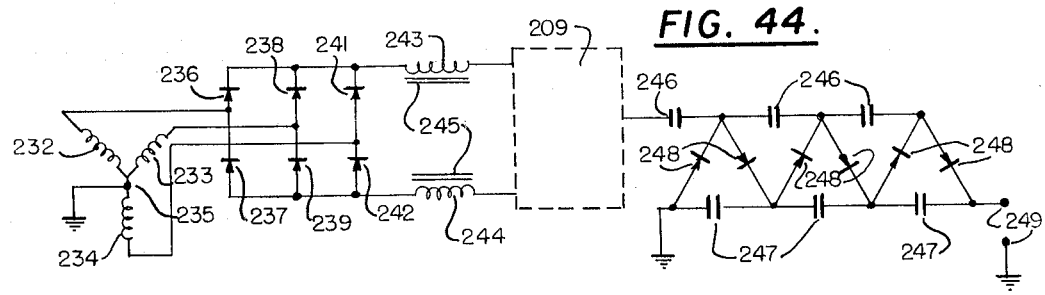
FIG. 44.
FIG. 45.
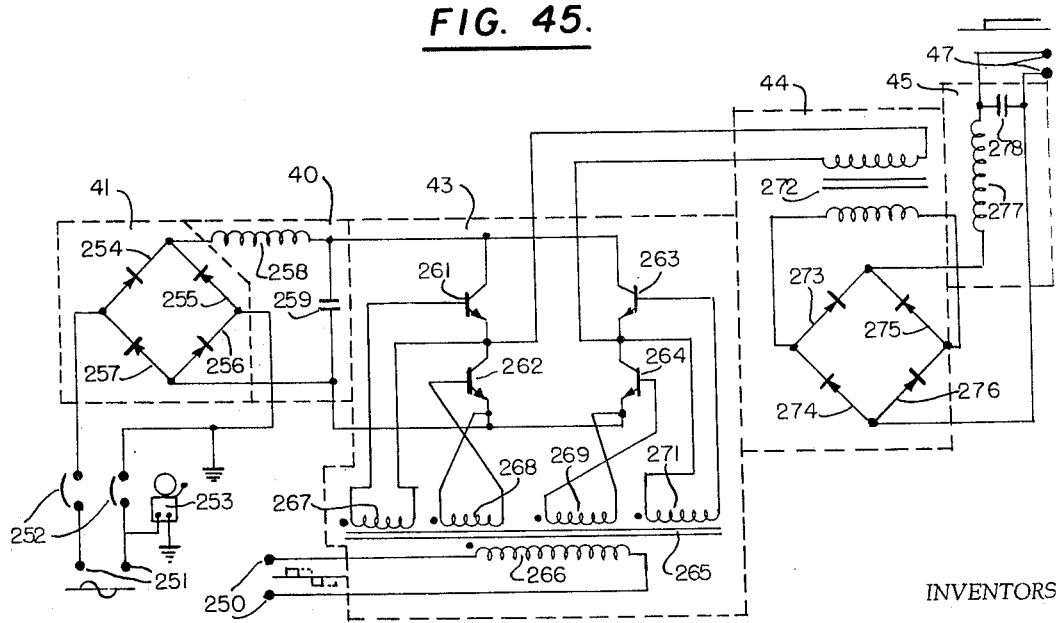
INVENTORS
Victor Wouk
Eliasz Poss
BY William Grohman
Lawrence J. Field
ATTORNEYS

United States Patent Office 3,295,048
Patented Dec. 27, 1966

3,295,048
CAPACITOR MEANS FOR CONTROLLING THE CONDUCTION OF UNIDIRECTIONAL SWITCHING DEVICES IN A POWER SUPPLY
Victor Wouk, New York, N.Y., and Eliasz Poss, Easthaven, Conn., assignors to Electronic Energy Conversion Corporation, New York, N.Y.
Filed May 22, 1961, Ser. No. 111,746
11 Claims. (Cl. 321—16)

This invention relates to power supplies, and, more particularly, to efficient supplies of selectively variable D.-C. and A.-C. potentials.

Originally, when the primary sources of electrical energy were direct current rotating machinery and chemical batteries, the major problem in power supplies was modifying the voltage from that generated by the source to that required by the load. Conversion from the use of direct current to alternating current for the bulk of the electrical equipment in the country led to the extensive use of highly efficient transformers, and the problem of changing the potentials was somewhat relieved.

More recently, power supply problems have been created by the tremendous growth of electronic communication and control equipment, which use direct currents, and the increasing trend toward miniaturization of such equipment. One of the primary uses of electronic equipment, and also of small D.-C. supplies, is in highly mobile apparatus, such as those for use in rocket and jet vehicles. In addition, large D.-C. supplies are necessary to operate the great amount of electronic data processing equipment being constructed and to operate the rapidly growing complex of wire and wireless communication equipment. Thus, there is presently a demand for D.-C. supplies for both small, highly mobile equipment and also for large capacity installations. In addition, the new sources of electrical energy, such as fuel cells, which supply electricity in large currents and low voltage, have created a demand for D.-C. to A.-C. power supplies.

It is an object of this invention to provide new and improved power supplies.

It is another object of this invention to provide new and improved direct current power supplies.

It is a further object of this invention to provide new and improved alternating current power supplies.

It is yet another object of this invention to provide new and improved power supplies having selectable output potentials.

It is yet a further object of this invention to provide new and improved power supplies which are efficient and provide control of the output potentials by comparatively small equipment.

Other objects and advantages of this invention will become more apparent as the following description proceeds, which description should be considered together with the accompanying drawings, in which.

Figure 4:
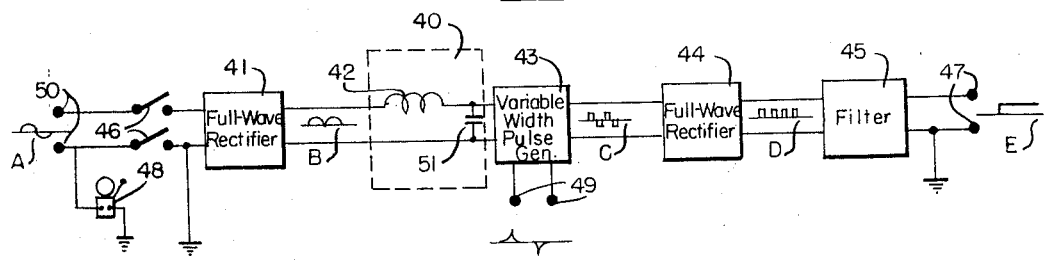
FIG. 4 is a block diagram of a power supply according to this invention.
Figure 6:
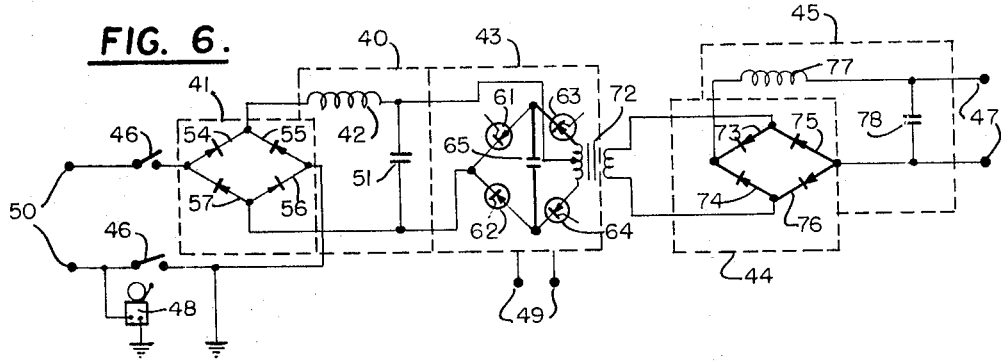
Figure 34:
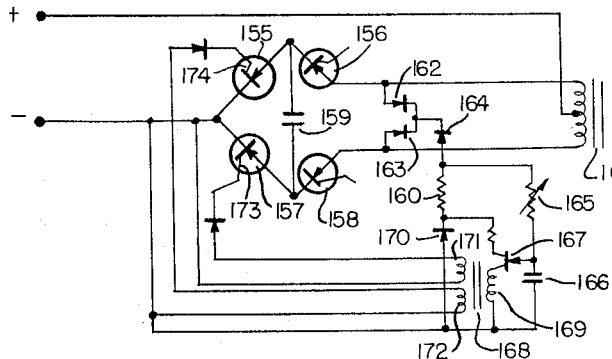
Figure 35:
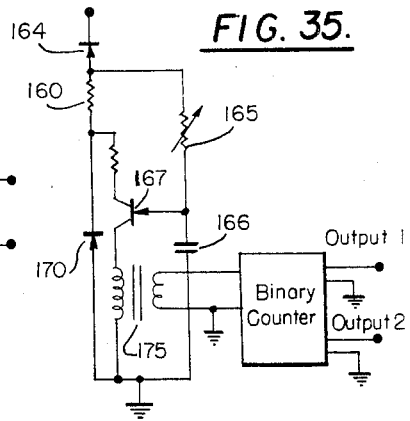
Figure 37:
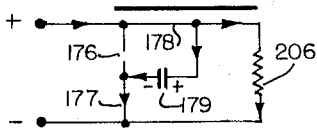

FIG. 5A–E is a group of curves illustrating the potentials at various points in the power supply of FIG. 4;

FIG. 6 is a circuit diagram of the single phase power supply of FIG. 4;

FIGS. 7, 8, 9 and 10 are schematic diagrams illustrating the operation of the pulse generator 43 of FIG. 6;

FIG. 11 is a diagram of the circuit of the pulse generator 43 of FIG. 6 showing timing circuits therefor;

FIG. 12 is a diagram of a three phase circuit for use with the power supply of FIGS. 4 and 6;

FIG. 13 is a circuit diagram of a direct current to alternating current power supply;

FIG. 14 is a circuit diagram of a power supply using a pulse generator including a second form of timing circuit;

FIG. 15 is a circuit diagram of another form of pulse generator;

FIGS. 16 and 17 are schematic diagrams of the pulse generator of FIG. 15 to illustrate the operation thereof;

FIG. 18 is a circuit diagram of yet another form of pulse generator;

FIGS. 19 and 20 are schematic diagrams showing the operation of the pulse generator of FIG. 18;

FIG. 21 is a circuit diagram of a further form of pulse generator suitable for use with this invention;

FIGS. 22, 23, 24, 25 and 26 are schematic diagrams of the pulse generator of FIG. 21 illustrating its operation;

FIG. 27 is a circuit diagram of yet a further form of pulse generator for use with this invention;

FIGS. 28, 29, 30, 31 and 32 are schematic diagrams which illustrate the operation of the circuit of FIG. 27;

FIG. 33 is a schematic circuit diagram of still another form of pulse generator, including timing circuits, which may be used with the power supply of this invention;

FIG. 34 is a schematic circuit diagram of a modified form of pulse generator which uses a single timing circuit;

FIG. 35 is a modification of the timing circuit shown in FIG. 34;

FIG. 36 is a circuit diagram of a simplified half wave pulse generator which may be used in the power supply of this invention;

FIGS. 37–42 are sketches showing the operation of the circuit of FIG. 36;

FIG. 43 is a single phase, voltage multiplying power supply according to the principles of this invention;

FIG. 44 is an example of a three phase, voltage multiplying power supply utilizing the principles of this invention; and FIG. 45 is a power supply using transistor switching elements in accordance with the principles of this invention.

Figure 1:
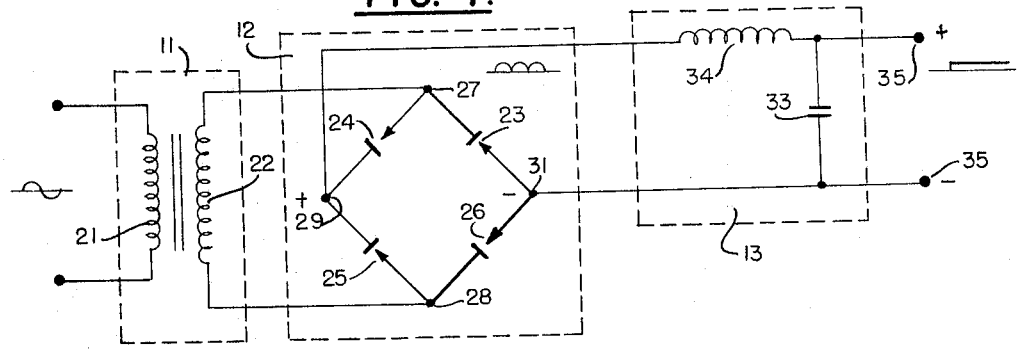
FIG. 1 is a schematic circuit diagram of a fixed voltage direct current power supply.

Referring now to the drawings in detail, and more particularly to FIG. 1, the reference character 11 designates an input transformer having a primary 21 and a secondary 22. The primary 21 is adapted to be connected to any standard source of single phase alternating current such as a 60 cycle, 110 volt source. The secondary 22 is connected to a full wave rectifier 12, which may be a bridge rectifier, as shown, having arms 23, 24, 25 and 26 with a rectifier of any suitable type in each arm. The secondary 22 is connected to junctions 27 and 28 at opposite ends of one bridge diagonal, and the rectified output from the bridge is taken from junctions 29 and 31 at opposite ends of the other diagonal of the bridge. Connected to the output from the rectifier 12 is a filter circuit 13 comprising a series choke 34 and a shunt capacitor 33 coupling the output from the rectifier 12 to output terminals 35 at which the filtered direct current is available.

The units enclosed by the dashed lines in FIG. 1; the transformer 11, rectifier 12, and filter 13; are intended to be exemplary and representative of many forms of such devices, and, therefore, the details of their construction are immaterial. The system of FIG. 1 represents the most common form of present day A.-C. to D.-C. power supply. A.-C. energy is supplied to the primary 21 of the transformer 11 to be transformed at the secondary 22 to the potential most suitable for the particular load to be served. The A.-C. output from the secondary 22 is applied to the rectifier 12 where it is converted into a pulsating D.-C. voltage as shown.

The choke-input filter 13 receives the output from the rectifier 12 and averages it, smoothing it to remove the pulsations and supplying smooth direct current to the output terminals 35 for application to the load.

From the above, it becomes apparent that power supplies are generally designed for the particular load to be supplied, or, at the most, for a group of loads which operate from the same potential and use values of currents which lie within a narrow range. The voltage at the output terminals 35 is determined by the output potential of the secondary 22 and the voltage drops in the system. Although the device need not operate at only one value of current flow, the components must be designed with sufficient capacity to handle the highest value of current the system is to supply. Whenever the current drain is less than this maximum, the equipment is being used inefficiently, and at higher current values, either the parts, such as transformers, overheat, or some components, usually filter chokes, saturate. In any case, the versatility of such power supplies is decidedly limited.

Figure 2:
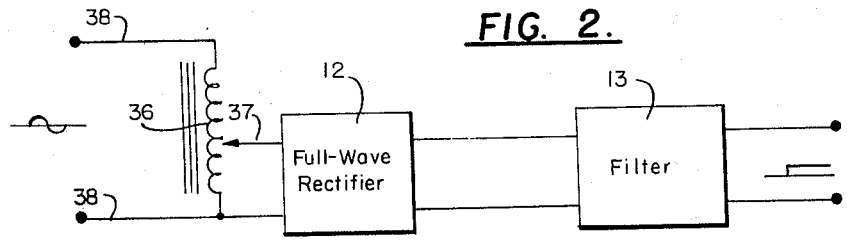
FIGS. 2 and 3 are block diagrams of variable voltage direct current power supplies.

Although the restrictions in the current supplied by such a system may remain, the limitations due to fixed potentials can be somewhat modified by providing some means for changing the output voltage of the system. Two such systems are shown diagrammatically in FIG. 2 and 3. In FIG. 2, single phase A.-C. energy is applied through lines 38 to an autotransformer 36. The output from the transformer 36 is applied through a movable tap 37 to a full wave rectifier 12 and filter 13 to produce direct current at the output, in a manner similar to that of the system of FIG. 1. The autotransformer 36 operates to provide an adjustable input potential over a range of potentials to permit the use of the system with many different loads or under differing conditions. As the movable tap 37 is moved upwardly, as shown in the figure, the ratio between the primary and the secondary of the transformer decreases, and the input and output potentials become more nearly equal. Conversely, as the tap 37 is moved downwardly, the transformer ratio is increased, lowering the potential applied to the rectifier 12. This provides a smooth adjustment for the output potential of the system.

Figure 3:
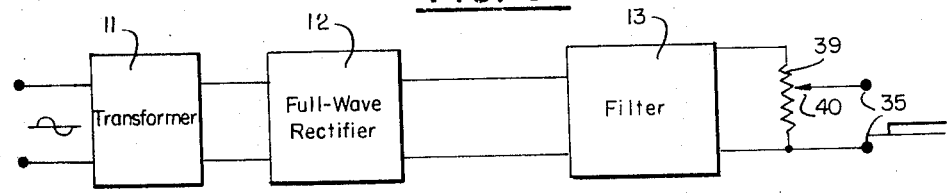

Another manner in which the output potential of a standard power supply circuit can be controlled is shown in FIG. 3, in which alternating current is supplied to the input of a transformer 11 to be transformed to the potential suitable for the load being fed. The output from the transformer 11 is applied to a full wave rectifier 12 for conversion to direct current. A filter 13, connected to the output from the rectifier 12, smooths the direct current to eliminate ripple, and the smoothed direct current is applied across a potentiometer 39, to which output terminals 35 are connected via a slide 40. The transformer 11, rectifier 12 and filter 13 operate in the same fashion and may be of the same construction as the corresponding components described and illustrated in FIG. 1. To adjust the output potential from the power supply of FIG. 3, the potentiometer slide 40 is adjusted upwardly or downwardly to increase or decrease the portion of the voltage available from the filter 13.

In addition to the above methods of controlling the output voltage, there is also the technique of employing a series impedance in the output or input circuit so as to maintain the output voltage at the desired level. This impedance can be automatically compensated by electronic or mechanical means, so as to maintain the output voltage constant with varying parameters. This principle is used in a large number of regulated power supplies.

However, when a series impedance is employed, the system is, of necessity, substantially less efficient than when no series impedance is employed. The circuits described in this invention achieve the same effect as series impedances, namely, controlling the voltage either manually or automatically, but do not represent the power loss inherent in series impedance devices.

Although voltage selectors such as those described above have been used in the past, they have been far from satisfactory. As the size of the load energized by a power supply is increased, the size of the regulatory components must be correspondingly increased, since these control components must carry the full power of the system. This means that the output current from the power supply is limited by the size of the controller, or, if the controller is made sufficiently large, then it is being used inefficiently at currents less than capacity. In any case, early potential control equipment was expensive, cumbersome, and inefficient, and power supplies were usually custom built for particular uses, and were rarely adjustable to any extent.

It has been found that the output potential of power supplies, whether supplying A.-C. or D.-C. potentials, may be adjusted over a wide range of values by a power supply such as that broadly illustrated in FIG. 4. A.-C. energy is applied through switches 46 to the input of a full wave rectifier 41 for conversion into D.-C. energy. At the input side of the switches 46, a buzzer, bell or other alarm 48 is connected between the line to be grounded and ground. A series choke 42 and a shunt capacitor 51 are connected between the output from the rectifier 41 and the input to a variable width pulse generator 43. The output from the pulse generator 43 is applied to a second full-wave rectifier 44, and the resultant direct energy is applied, through a choke-input filter 45, to suitable output terminals 47 for connection to a load. A switching signal is applied to the pulse generator 43 through input terminals 49.

Figure 5:
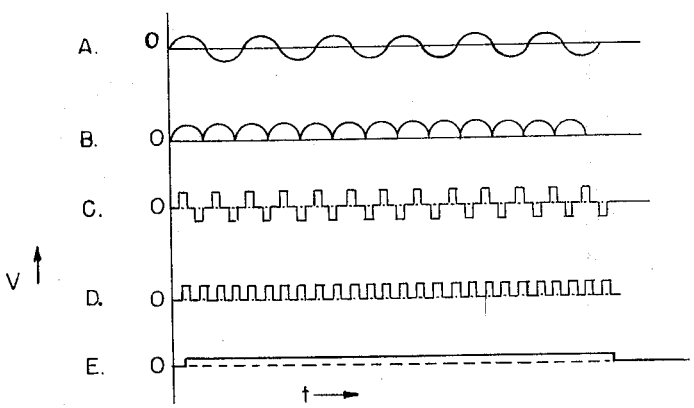

The operation of the system of FIG. 4 is readily explainable with reference to the curves A-E of FIG. 5 in which potential is plotted against time. Corresponding curves are also shown in FIG. 4 adjacent the portions of the circuit wherein they exist. Curve A illustrates the general form of the potential applied to the input terminals of the full wave rectifier 41. The input energy may be applied directly to the rectifier, if the rectifier is a bridge circuit, thus eliminating the need for an input transformer. After rectification, the output from the rectifier 41 has the general form illustrated in curve B. This form is somewhat modified by the inductor 42 and capacitor 51 so that the energy applied to the input of the pulse generator 43 is a more nearly smooth direct current. A high frequency switching signal, which may be of a generally rectangular form (as shown in curve C) or other suitable A.-C. wave shape, is applied to the input terminals 49 of the pulse generator 43. Although the switching signal is shown only approximately twice the frequency of the A.-C. input to rectifier 41, its frequency in practice will more usually be several orders higher than that of the input energy to the system, the low frequency signal being shown in curve C for purposes of simplicity and clarity. Actually, there are no rigid restrictions on the switching signal. However, for best results, the signal applied to the terminals 49 should have a selectively variable width, phase or timing, although its frequency may be substantially constant, and that frequency should be considerably higher than that of the A.-C. energy applied to the rectifier 41, as mentioned above. The output of the pulse generator 43 has a generally rectangular wave form and is of the same frequency as that of the switching signal applied to terminals 49, so that a generally rectangular wave of comparatively high frequency is applied to the input to the second full wave rectifier 44. The rectified output from rectifier 44 is shown in curve D and is applied to the filter 45, from which D.-C. energy having the shape shown in curve E emerges.

In the system shown in FIG. 4, some of the components may have one side grounded. To ensure that the input to the system is properly connected with respect to ground, the input is applied through input power switches 46, to one of which an alarm 48 is connected. The alarm 48 is connected from the input side of the switch 46, which is in the grounded input line, and ground. Should the input lines be inadvertently reversed, current passes through the alarm 48, which is then connected to the ungrounded line, and the error is signalled before switches 46 are closed to apply power to the system.

The output voltage from the terminals 47 has been found to bear a direct relationship to the width of the pulses emerging from the pulse generator 43; the wider the pulses, the higher the output voltage. Therefore, in the system of FIG. 4, the magnitude of the output voltage can be controlled by controlling the width, phasing or timing of the switching signals applied to the terminals 49 of the pulse generator 43.

To more clearly illustrate the apparatus by which an adjustable D.-C. potential can be derived from a source of A.-C. potential, reference is now made to FIG. 6. So that the correspondence between the block diagram of FIG. 4 and the schematic circuit of FIG. 6 may be clear, the components contained in the blocks of FIG. 4 are surrounded by dashed lines in FIG. 6 and bear the same reference characters. A.-C. energy is applied to input terminals 50, through switch means 46, or other safety power switch means, to a full wave rectifier 41. The rectifier 41 comprises a bridge having arms 54, 55, 56 and 57, in each of which is a suitable rectifier. The input alternating energy is applied to opposite ends of one bridge diagonal defined by the junctions of arms 54 and 57 and arms 55 and 56, and the rectified output current is taken from the other bridge diagonal defined by the junctions of arms 54–55 and arms 56–57. An alarm, such as a buzzer 48, has one side connected to one of the input terminals 50 and the other side connected to ground, and one side of the input to the rectifier 41 is also grounded. In this case, neither side of the output circuit elements may be grounded. The output from the rectifier 41 passes through a filter comprising a series inductor 42 and shunt capacitor 51. The output from the filter is then applied as direct current, unregulated, to a balanced variable width pulse generator 43 comprising controlled rectifiers 61, 62, 63 and 64 arranged in a bridge circuit. The rectifiers 61–64, which may be controlled silicon rectifiers as shown, switching transistors, or the like are normally nonconductive and remain in the condition until they are rendered conductive by an applied signal. Once the controlled rectifier conducts, it remains conducting until its conduction path is otherwise interrupted or a reverse polarity pulse of sufficient amplitude is applied to it. The output from the pulse generator 43 is taken through an output transformer 72 and applied to a second full wave rectifier 44 comprising a bridge having arms 73, 74, 75 and 76. The output from the rectifier 44 is applied to a filter 45 which comprises a series choke 77 and a shunt capacitor 78. The filtered direct current is available at output terminals 47.

Figure 7:
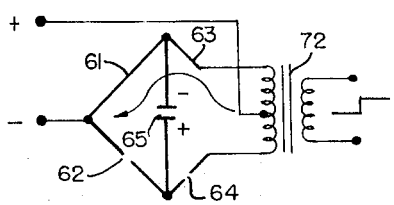
Figure 8:
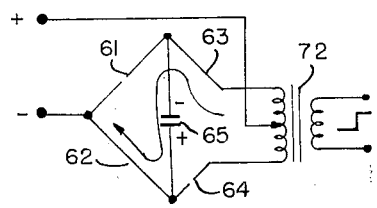
Figure 9:
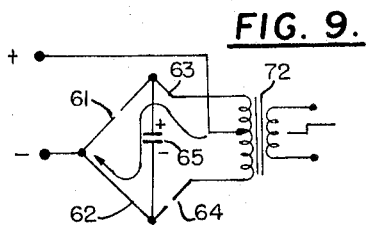
Figure 10:
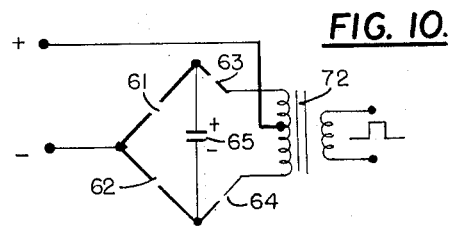

In operation, the input terminals 50 are connected to a source of single phase alternating current such as a source of commercial 60 cycle, 110 volt energy. If the terminals are inadvertently reversed, the alarm 48 will be connected between the ungrounded lead and ground, and a signal will be sounded. When the terminals are properly connected to the source of electrical energy, the switches 46 are closed and the alternating current is applied across the rectifier 41. The output from the rectifier 41 is of the form shown in curve B of FIG. 5 and is applied to the choke-input filter 42–51 where it is filtered and the ripple substantially removed. The pulse generator 43 then has direct current applied across it. Until at least one of the controlled rectifiers 61–64 is switched on, no current flows through the pulse generator. Reference to FIGS. 7 through 10 will aid in the explanation of the operation of the pulse generator 43. The rectifiers 61–64 may be controlled silicon rectifiers such as those described in G.E. Manual on Silicon Controlled Rectifiers, first edition, edited by Semiconductor Products Department, Advertising and Sales Promotion, General Electric Co., Liverpool, N.Y., 1960. In FIGS. 7–10, the bridge is diagrammatically shown with only the arms present; none of the rectifiers are shown. If positive signals are applied to the control electrodes of rectifiers 61 and 63, these rectifiers will conduct, and current will flow as shown in FIG. 7. The current flows from the positive input terminal, through the upper portion of the primary of transformer 72, through the rectifiers 63 and 61 to the negative input terminal. The potential induced in the secondary of transformer 72 rises with the initiation of current flow through the rectifiers 63 and 61. When the current flow is to be terminated, a positive signal is applied to the control electrode of rectifier 62, rendering that rectifier conductive. This applies a reverse polarity voltage across rectifier 61 via the capacitor 65 which has been charged, previously, in the polarity shown. This causes rectifier 61 to stop conducting as explained above. Current then flows through the rectifier 62, capacitor 65 and rectifier 63 (see FIG. 8) to charge the capacitor 65 in the opposite polarity from which it was originally. When the rectifier 61 stops conducting, as shown in FIG. 9, all of the current flowing in the bridge passes through the capacitor 65, and when this capacitor has charged to the applied potential, current flow ceases, as shown in FIG. 10. Thus, a positive pulse is generated in the secondary of the transformer 72. To generate the negative pulse, the same procedure is followed except that rectifiers 64 and 62 are first rendered conductive to initiate the pulse, and then rectifier 61 is made conductive to terminate the pulse. The current flow during the generation of the negative pulse is through the lower portion of the primary of the transformer 72, rectifiers 64 and 62, to the negative input terminal. This induces a negative-going pulse in the secondary of transformer 72. When rectifier 61 is made conductive, the first surge of current through the capacitor 65 and the rectifier 61 produces a pulse of reverse polarity across the rectifier 62, tending to halt conduction therethrough. When the capacitor 65 has charged back to the condition shown in FIG. 7, all conduction in the circuit ceases.

However, the proper operation of the circuit as described above depends upon the initial charge upon the capacitor 65. If the rectifiers 61 and 63 are rendered conductive at first, then the capacitor 65 must be charged with the polarity shown. If otherwise, then the firing of the rectifier 62 will have no effect since the capacitor will be charged with a polarity which is opposite to the direction of conduction of the rectifier 62. To avoid this situation, with the generator 43 in starting condition, the capacitor is uncharged, and rectifiers 61, 63 and 64 are fired simultaneously. Then current will flow from the positive input line from the rectifier 41 and through the primary of the transformer 72 in both halves. The flow through the upper half of the primary of the transformer 72 and through rectifiers 63 and 61 is as described above. The flow through the lower half passes through the capacitor 65 and rectifier 61 to the negative input line. This second path conducts only until the capacitor 65 is charged, which will be with the polarity shown in FIG. 7, and then ceases, permitting rectifier 64 to become non-conductive. The main current will continue to flow through the rectifiers 61 and 63 until rectifier 62 is fired, permitting the capacitor 65 to discharge and terminate the flow through rectifier 61. Should the capacitor 65 be initially charged in the improper polarity, it would then first discharge through rectifiers 61 and 64 and then charge in the correct direction. For the negative pulse, the rectifiers 62, 64 and 63 are simultaneously rendered conductive, and the action proceeds as described.

From the above, it can be seen that the duration of either the positive or negative pulses generated by the generator 43 is controlled by the interval between when the first rectifiers are made conductive to start the pulse, and when the terminating signal is applied to the turn off rectifier to cut off one of the conducting rectifiers. By controlling the time between the initiation of conduction in the rectifiers and the time that they are cut off, the width of the pulses may effectively be controlled. By providing substantially identical timing circuits for both the positive and the negative pulses generated by the generator 43, the output potential of the power supply of FIGS. 4 and 6 can be accurately controlled.

The generator 43 of FIGS. 4 and 6, together with timing circuits for establishing and terminating conduction through the rectifiers is shown in schematic form in FIG. 11. A.-C. timing signals are supplied to a transformer 53 which has four secondaries 58, 59, 70 and 71. One side of secondary 58 is connected to the control electrode 68 of the rectifier 63 and the other side is connected to the cathode electrode of the same rectifier. The two sides of secondary 59 are connected to the control electrode 66 and the cathode of the rectifier 61. Similarly, the secondaries 70 and 71 are connected to the control electrode 67 and the cathode of the rectifier 62 and to the control electrode 69 and the cathode of the rectifier 64, respectively.

The secondaries 70 and 71 are so connected that the electrodes 67 and 69 of the rectifiers 62 and 64 receive positive signals 180° later than the positive signals applied to electrodes 66 and 68 of rectifiers 61 and 63. Diodes are provided in at least one line from each secondary to ensure that the control electrodes receive only positive signals and are unenergized on the negative portions of their cycles. A series arrangement of a zener diode 79, potentiometer 81 and capacitor 82 is connected from one side of the output transformer 72 to the negative input line. In parallel with the potentiometer 81 and the capacitor 82 is a unijunction transistor 83 and a pulse transformer 84. Unijunction transistors are described in "Basic Theory and Application of Transistors," published by Department of the Army in 1959, TM11-690, pp. 242-243. A similar arrangement is connected from the other side of the primary of output transformer 72 to the negative input line. To avoid cluttering the drawing, biasing resistors for the unijunction transistors, and the like, are omitted.

Whenever the potential induced in the secondaries 58 and 59 reach a calculated positive potential, conduction in the controlled rectifiers 61 and 63 is initiated by the application of that positive potential to the control electrodes 66 and 68. After conduction through rectifiers 61 and 63 has begun, the potential at the top of the primary of the transformer 72 is essentially that of the negative input line, making the potential drop across the conducting half of the primary of output transformer 72 the same as the direct potential applied at the input. Because the transformer primary is center-tapped and the primary acts as an autotransformer, the potential across each half of the primary of transformer 72 is the same as the input potential, and the voltage across the entire primary is about twice the input potential. Since rectifiers 62 and 64 are not conducting, the full potential across the primary also exists across the series circuit comprising the zener diode 79, potentiometer 81 and capacitor 82. This potential difference is sufficient to fire the diode 79. Current then flows through the capacitor 82 and the potentiometer 81, charging the capacitor. When the capacitor potential reaches a prescribed level, the unijunction transistor 83 becomes conductive, allowing the capacitor 82 to discharge rapidly through the transformer 84, generating a pulse in its secondary. The pulse generated by the transformer 84 is applied with a positive potential to the control electrode 67 of the rectifier 62 to initiate conduction therethrough. Once the rectifier 62 has begun to conduct, current passes through the capacitor 65 generating a sharp pulse of reverse polarity, and the rectifier 61 begins extinguishing. The remainder of the positive pulse generation cycle continues as explained with FIGS. 9 and 10. When the negative half cycle passes through the primary of the transformer 53, a positive potential is applied to the control electrodes 67 and 69 of rectifier 62 and 64, causing them to conduct. This produces the same effects in the circuit of FIG. 11 as did the initiation of conduction through rectifiers 61 and 63 except that conduction is through rectifiers 62 and 64, reversing the resultant output polarities. The series timing circuit bridging the rectifiers 61 and 63 is energized, initiating conduction through rectifier 61 in the same manner as conduction through rectifier 62 was initiated. Rectifier 62 then ceases to conduct, and when capacitor 65 has discharged and recharged in the opposite direction, rectifier 64 also ceases to conduct, restoring the generator to its initial condition.

The timing of the circuit can be regulated by the settings of the potentiometer 81 and its counter-part. The setting of the potentiometer 81 determines the time in which the capacitor 82 charges to a potential sufficient to cause the transistor 83 to conduct. Therefore, the width of the pulse output of the pulse generator of FIG. 11 is adjusted by the settings of the potentiometers. Since these potentiometers carry very little current, they may be extremely small and will dissipate very little energy. The input to the transformer 53, shown here as an A.-C. pulse signal, may be of any suitable frequency, but for best operation, the frequency should be comparatively high, say for example 400 to 24,000 cycles per second. However, the frequency should not be so high that extensive radiation into space occurs. Since only small currents and voltages are required to initiate conduction in the rectifiers 61–64, the transformer 53 and its source may both be quite small. However, the rectifiers 61–64 may readily carry 25 amperes at 400 volts across the load, supplying 10,000 watts of power, and the output voltage is readily controlled in amplitude by potentiometers 81 and its counterpart in the other circuits which are small, about one watt capacity. In addition, the system of FIGS. 4–11 is self-regulating. Should the voltage of the source connected to input terminals 50 rise, the voltage across the pulse generator 43 also rises, the potential applied through potentiometer 81 to capacitor 82 rises, and the time interval required for the capacitor 82 to reach the potential necessary to fire transistor 83 decreases, decreasing the width of the output pulses. The reverse operation takes place when the input potential drops slightly, rendering the power supply automatically regulating.

There is also a substantial advantage in the system of FIGS 4–11 at low output voltages, since, for a given load current, the R.M.S. current in transformer 72 or in any other transformer in the output of the circuit decreases with decreasing load potential. For example, at ¼ v., where V is the rated output voltage, the R.M.S. transformer current for a given output current load will be ½ as great as the current at V. The transformers used in power supplies are very often the single most limiting component in the entire circuit because of heating. Therefore, insofar as transformer loading is concerned, the power supply of this invention can provide more current at less than maximum voltage than can the more common forms of power supplies. At ¼ voltage, the transformers in the power supply of this invention can supply twice as much current as to full voltage; at ⅑ voltage, the current could be 3 times as great, etc. Since the size of the transformer is important, such a consideration is also important, for the possibility of overloading a transformer at low voltages is greatly reduced.

High frequency advantages are also achieved in the utilization of the transformers as well as in the filter circuits. As stated above, the single component in a power supply which is both the largest and the heaviest is the transformer which carries the load current. The generation of variable width unidirectional pulses would result in a net direct current flowing in the transformer 72. In order to avoid saturation of the iron in the transformer due to this net direct current, the transformer would ordinarily have to be made larger and heavier. The generation of A.-C. pulses in the pulse generator 43 reduces to substantially zero the effective net direct current flowing in the transformer, and, as a result, smaller transformers can be used while providing larger current capacities.

A three phase unit for use with the power supply of this invention is illustrated in FIG. 12. Three phase A.-C. energy is applied to the three phase input terminals 281 and passes through the circuit breaker 282, or other power switching means to three phase lines 283, 284 and 285. Line 283 carries a first phase and is connected between a pair of diodes 86 and 87 poled oppositely from their junction with line 283; line 284 carries a second phase and is connected between another pair of diodes 88 and 89; and line 285 carries the third phase and is connected between a third pair of diodes 91 and 92. All of the diodes 86–92 are poled the same as diodes 86 and 87 to form a three phase, full wave rectifier. The output of the rectifier is applied to a filter circuit comprising series choke 93 and shunt capacitor 94. Across the lines carrying the filtered direct current may be a string of semi-conductor thermoelectric cooling devices. The filtered rectified current is applied to a variable width pulse generator, rectifying and filtering circuits 96 such as described above.

In operation, the diodes 86–92 are connected for full wave rectification, applying six pulses per cycle to the filter circuit 93–94. Because of the effective multiplication of the initial frequency, the inductor 93 and capacitor 94 may be much smaller than the equivalent filter units used for single phase operation. Since one of the primary causes of trouble and degradation of semi-conductor devices is heat, a string of semi-conductor cooling devices 95 may be provided as a bleeding resistor in those cases where a bleeder is desirable, and also to cool the semi-conductor switches in the pulse generator. Very often, the use of such cooling units will permit the choice of the smaller of two components being considered, thus serving to partially recover the cost of the cooling devices, and providing more stable and longer lived operation.

Hereinabove, direct current power supplies have been described. But the principles of this invention may be utilized for alternating current power supplies also. An A.-C. potential power supply is illustrated in FIG. 13 and comprises a pair of input terminals 101 to which direct current is applied for application to a variable width pulse generator 102. The output of the pulse generator 102 is applied to the input of a transformer 103 for transformation into pulses having a basic sine wave shape. To improve the shape of the wave and to eliminate unwanted frequencies, the output from the transformer 103 is applied to a filter comprising series inductors 104 and 105 and shunt capacitors 106 and 200. The A.-C. output potential appears at terminals 206 for application to a load. To recover some of the energy circulating in the filter circuits, a transformer 109 is connected in series with the capacitor 106. A full wave rectifier 111 is connected across the output from the transformer 109 and feeds its output to the input to the pulse generator 102. A second transformer 220 is connected in series with the capacitor 200 and has a rectifier 230 connected between its output and the input to the pulse generator 102.

In operation, the input D.-C. energy is applied to the pulse generator 102 wherein A.-C. pulses of adjustable width are generated. These A.-C. output pulses from the generator 102 are applied to the transformer 103, and, if desired, the level of the voltage in the system may also be determined by the transformer 103. Since the output of the transformer 103 may not be a sufficiently pure sine wave for the purposes intended, it is applied to the filter circuit to reshape the fundamental wave and remove the unwanted harmonics. The output alternating current appears at the output terminals 206 and may be readily controlled by controlling the timing, phase or width of the switching signals applied to the pulse generator 102 in a manner similar to that explained above. As the width of the pulses from the generator 102 are widened toward a square wave, the output potential at terminals 206 is increased.

To recover some of the circulating current from the filter and reduce the losses therein, feedback circuits such as the transformer 109 and 220 and rectifiers 111 and 230 may be provided. The current passing through the capacitors 106 and 200 also passes through the primaries of the transformers 109 and 220. Since the circulating currents are A.-C., corresponding currents are induced in the secondaries of the transformers 109 and 220. These currents are rectified by the rectifiers 111 and 230 and returned to the input of the pulse generator 102 as unregulated direct current. This type of circuit may be applied to any filter wherein current circulates.

The pulse generator illustrated in FIG. 11 generates adjustable width pulses automatically, the width of the pulse output being determined by the settings of the potentiometers 81 and their counterparts in the other circuits. However, as stated earlier, the circuit operates automatically only if the capacitor 65 is initially charged in the polarity indicated and if the first rectifiers to conduct are 61 and 63, or if the polarity of the capacitor 65 is reversed and rectifiers 62 and 64 are conductive first. To overcome this objection, the pulse generator illustrated as part of the power supply shown in FIG. 14 was developed. As in the circuit of FIG. 6, those portions of the circuit which are the same throughout the various figures are identified by the same reference characters.

A.-C. energy, as from a commercial source of 60 cycle 110 volts, is applied to input terminals 50. That input terminal 50 which is to be grounded is also connected to one side of an alarm 48, the other side of which is grounded. Switches 46 connect the input terminals 50 with the input to a full wave rectifier 41, shown here as a rectifier bridge having arms 54, 55, 56 and 57, each arm having a suitable diode connected therein. The output from the rectifier 41 is applied to a filter comprising series choke 42 and shunt capacitor 51. The rectified and filtered output from the filter is applied across a variable width pulse generator 43 which comprises a bridge having silicon controlled rectifiers 61, 62, 63 and 64, or the like, in its arms. The pulse output from the generator 43 is applied through a transformer 72 to a full wave rectifier 44 comprising a bridge having arms 73, 74, 75 and 76, and the rectified output is filtered by a filter 45 comprising a series choke 77 and a shunt capacitor 78 to provide filtered direct current of adjustable amplitude at output terminals 47.

The power supply of FIG. 14 operates, in general, the same as the power supply of FIGS. 4 and 6 in which the amplitude of the output potential is determinable by the width of the pulses generated by the pulse generator 43. To automatically generate pulses of a determinable width, the rectifiers 61–64 are made conductive and non-conductive at selected times. A source 20 of electrical A.-C. energy, preferably but not necessarily short duration steep pulses, is connected to the primary 30 of an input transformer 32 which has secondaries 52 and 60 respectively connected to the control electrode 68 and cathode of rectifier 63 and control electrode 66 and cathode of rectifier 61. A line 91 from one side of the source 20 also feeds a circuit comprising the primary 80 of a transformer 90, a transistor 120 and a capacitor 97. The transformer 90 has a secondary 100 connected to the control electrode 69 and cathode of the rectifier 64 and a secondary 110 connected to the control electrode 67 and cathode of rectifier 62. A resistor 147 connects one side of capacitor 65 to the negative line from the full wave rectifier 41, and a resistor 160 connects the other side of the capacitor 65 to the positive line from the rectifier 41, establishing a complete charging circuit for the capacitor 65 from the direct current output of the rectifier 41. The turn-off circuit for rectifiers 61 and 63 is enclosed in dashed lines generally designated 104 and comprises a series branch formed by a zener diode 15, potentiometer 16 and capacitor 17, and a parallel branch of transistor 18 and transformer 19. An identical turn-off circuit for the rectifiers 62 and 64 is enclosed by dashed lines generally designated 180.

The operation of the power supply of FIG. 14 is similar to that of FIGS. 4 and 6. Alternating current, such as from a source of commercial 60 cycle, 110 volt energy, is applied to input terminals 50 and transferred through closed switches 46 to the input of the full wave rectifier 41. The alarm 48 is connected between the ungrounded input line and ground if the terminals 50 are incorrectly connected to the source, and the alarm 48 sounds, indicating the error. The alternating current is rectified by the rectifier 41 and is filtered by the choke 42 and the capacitor 51. Thus, direct current is supplied to the variable width pulse generator 43. The pulse output from the generator 43 is applied to the second full wave rectifier 44 through the transformer 72, and the rectified output from the rectifier 44 is filtered by the filter 45 for application to the output terminals 47. The load is connected to the terminals 47.

A.-C. energy of a comparatively high frequency is supplied to transformer 32 of the pulse generator 43 by any suitable source 20. As mentioned above, the source 20 may comprise a high frequency filter fed from 60 cycle energy to pass only the higher harmonics, or it may be a separate source of energy such as rotating machinery or an electronic oscillator. The output from secondaries 52 and 60 of transformer 32 contains rectifiers so that only positive portions of a cycle are transmitted to the control electrodes 66 and 68 of the rectifiers 61 and 63. In the same manner, line 91 also contains a diode so that only the negative portions of a cycle from the source 20 are applied to the firing transistor 120 which transmits current to the primary 80 of the transformer 90. However, the secondaries 100 and 110 of the transformer 90 contain diodes so that the positive portions of the output from the transformer 90 are applied to the control electrodes 67 and 69 of the rectifiers 62 and 64. Because the positive portions of the A.-C. output of the source 20 are applied to the primary 30 and the negative portions of the same signals are applied to the primary 80, the positive potentials applied to the control electrodes 66 and 68 of the controlled rectifiers 61 and 63 are one-half cycle out of phase with the positive potentials applied to the control electrodes 67 and 69 of controlled rectifiers 62 and 64.

When the switches 46 are closed, a D.-C. potential is applied across the generator 43, and current passes through resistors 147 and 160 to charge the capacitor 65 to the polarity shown. The resistors 101 and 102 may be of high ohmic value to avoid unnecessarily loading the circuit, since all that they are required to do is to pass enough current to permit the capacitor 65 to charge. When A.-C. energy is then applied to the transformers 32 and 90 from the source 20, correct operation is assured. If the first output from the source 20 is negative, then a potential is applied to the unijunction transistor 120 for application to the transformer primary 80. However, the transistor 120 is not conductive unless current is passing through controlled rectifiers 61 and 63. Therefore, no pulse is generated in secondaries 100 and 110 to be applied to the control electrodes 67 and 69. If, however, the first output from the source 20 is positive, then energy is supplied to the primary 30 to generate positive potentials in the secondaries 52 and 60. The controlled rectifiers 61 and 63 are made conductive, and current passes through the top portion of the primary of transformer 72, controlled rectifier 63, controlled rectifier 61, and the negative line to the rectifier 41. A positive pulse is induced in the secondary of the transformer 72. When current begins flowing in the primary of the transformer 72, a peak voltage of approximately twice the input potential is generated across the controlled rectifiers 62 and 64. This high voltage pulse is sufficient to cause zener diodes 15 and 140 to become conductive. Current then passes through diode 15, potentiometer 16 and capacitor 17 to charge that capacitor. When the potential across capacitor 17 becomes high enough, transistor 18 becomes conductive, allowing the capacitor 17 to discharge through the primary of the transformer 19 and generate a pulse which turns on controlled rectifier 62. At the same time, current flows through diode 140, resistor 189, capacitor 97 and capacitor 98 to charge those capacitors. When the potential across capacitor 98 reaches a prescribed value, it conditions transistor 120 for conduction.

Initiation of conduction in the controlled rectifier 62 by the discharge of capacitor 17 through the primary of transformer 19, establishes a low resistance path through the upper portion of the primary of transformer 72, controlled rectifier 63, capacitor 65 and controlled rectifier 62 to the negative side of the rectifier 41. A reverse potential pulse is thereby generated and applied across the controlled rectifier 61, causing that rectifier to become non-conductive. Conduction continues until the capacitor 65 is charged in the opposite direction, and then conduction ceases in the circuit. The capacitors 97 and 98 retain their charges, however. When the next half cycle appears at the output of the source 20, the transistor 120 becomes conductive, and current from capacitor 97 flows through the primary 80 of the transformer 90 to generate positive pulses in the secondaries 110 and 100 which are applied to the control electrodes 67 and 69 and initiate conduction in controlled rectifiers 62 and 64. From this point, the circuit operates automatically to generate alternating positive and negative pulses at the secondary of the transformer 72. The widths of the output pulses are controlled, as mentioned in the description of FIG. 11, by the settings of the potiometers 16, which, together with the capacitors 17 and the applied potentials, determine the times at which the transistors 18 become conductive to terminate the pulse then being generated.

The variable width pulse generators of FIGS. 11 and 14 both depend, at least in part, upon the generation of high potential pulses in the circuit for their successful operation. That type of operation is possible with those circuits because such high voltage pulses are inherently generated whenever conduction in parts of the circuit is either initiated or terminated. However, if controlled semiconductor rectifiers are to be used, the high voltage pulses become expensive, because the individual rectifiers must be able to withstand the highest potentials to which they are to be subjected, and the cost of such rectifiers increases sharply with their breakdown voltages. The basic pulse generator of FIG. 15 overcomes this disadvantage to some extent. The pulse generator of FIG. 15 comprises a bridge circuit having arms containing controlled rectifiers 61, 62, 63 and 64. A capacitor 65 is connected as one diagonal of the bridge, being connected to the junction of rectifiers 61–63 and the junction of rectifiers 62–64. The output is taken from the secondary of a transformer 72, the primary of which is connected between rectifiers 63 and 64. Direct current is supplied from a source, such as the full wave rectifier 41 of FIGS. 4, 6 and 14, to the other diagonal of the bridge, the negative line being connected to the junction of rectifiers 61–62 and the positive line being connected to two parallel branches formed of additional controlled rectifiers 107 and 108 which are connected from the positive input line to opposite sides of the primary of transformer 72. The rectifiers may be controlled silicon rectifiers, as mentioned above, or any other suitable unidirectional conductive device which does not conduct until gated on, and which, when conductive, does not cease conducting until either its series circuit is interrupted or a reverse potential of sufficient amplitude and duration is applied across it.

The operation of the circuit of FIG. 15 is readily explained with reference to FIGS. 16 and 17. With the capacitor 65 charged as shown in FIG. 16, by any suitable means such as the resistors 147 and 160 of FIG. 14, conduction is initiated in controlled rectifiers 61, 63 and 108 simultaneously. Current then flows through the circuit as shown in FIG. 16. It should be understood at this point, that the circuits for generating the positive pulses which initiate conduction in the controlled rectifiers in the proper sequence and phase may be supplied from any suitable source such as the circuitry of FIG. 11 or FIG. 14. With current flowing through the controlled rectifier 108, through the primary of the transformer 72, and through controlled rectifiers 63 and 61, a positive pulse is generated in the secondary of the transformer 72. Since the primary of the transformer 72 is not center-tapped, current flow is through the entire primary at any time, and only the line voltage appears across it. This reduces the potentials to which the rectifiers are subjected. When the conduction through the circuit is to be terminated, conduction is initiated in controlled rectifier 62 establishing a low resistance path through the capacitor 65. The initial surge of current through the capacitor 65 generates a high potential pulse of reverse polarity which is applied across the controlled rectifier 61, causing that rectifier to cease conduction. When conduction through rectifier 61 stops, conduction through the capacitor 65 continues until the capacitor is charged in the opposite direction. With the capacitor 65 fully charged, all conduction in the circuit ceases. To generate the negative pulse, conduction is initiated in controlled rectifiers 62, 64 and 107. Generation of the negative pulse is terminated by initiating conduction in rectifier 61. Current then begins to flow through capacitor 65, generating a reverse polarity pulse across rectifier 62 and interrupting the flow of current therethrough. Again, when capacitor 65 has charged to the opposite polarity, that shown in FIG. 16, all conduction in the circuit ceases. As in the circuits discussed above, conduction is initiated in any of the controlled rectifiers 61–64 and 107–108, by the application of a positive potential to its control electrode. Although there are no high voltages generated by autotransformer action of the transformer 72, a high voltage pulse is generated whenever current begins flowing through the capacitor 65. It is this pulse which terminates the conduction through one of the conductive controlled rectifiers.

A pulse generator somewhat similar to that of FIG. 15 but requiring no phasing or polarity controlling circuitry is illustrated in FIG. 18. A bridge comprising four controlled rectifiers 61, 62, 63 and 64 is supplied with direct current from any suitable source such as the full wave rectifier 41 of the power supplies of FIGS. 4, 6 and 14. The output from the generator of FIG. 18 is taken from an output transformer 72, the primary of which is connected across one diagonal of the generator bridge. The direct current input is applied across the other diagonal of the bridge. A pair of small controlled rectifiers 111 and 112 are connected in series across the direct current input to the bridge, and a commutating capacitor 213 is connected from the junction of the input controlled rectifiers 111 and 112 to one side of the primary of the output transformer 72.

In operation, direct current is supplied to the bridge. Positive pulses are then applied to the control electrodes of controlled rectifiers 111, 61 and 64. Current through the bridge flows as shown in FIG. 19, from the positive line, through controlled rectifier 111, capacitor 213, controlled rectifier 61 to the negative input line. Current flows through this path only until capacitor 213 is charged in the polarity shown. However, at the same time, the main conduction path is established from the positive input line, through controlled rectifier 64, through the primary of the transformer 72, through controlled rectifier 61 to the negative input line. When the capacitor 213 is charged, conduction through controlled rectifier 111 ceases, even though the main current may continue to flow through the controlled rectifiers 64 and 61. Current flowing through the primary of the transformer 72 in the direction shown in FIG. 19 generates a positive pulse in the secondary. To terminate the generation of the positive pulse, current flow through the controlled rectifier 112 is initiated. Capacitor 213 begins discharging through controlled rectifier 112, generating a large pulse of reverse polarity across controlled rectifier 61, terminating conduction in that rectifier. Current continues to flow through controlled rectifier 64 as shown in FIG. 20 until the capacitor 213 is fully charged in the other direction, at which time conduction through the capacitor 213 ceases, and terminates conduction in the rest of the bridge. The generation of the negative pulse output from the secondary of the transformer 72 proceeds in the same manner, except that controlled rectifiers 62, 63 and 112 are rendered conductive at the same time to start the generation of the pulse. The negative pulse is terminated by initiating conduction through controlled rectifier 111, through which the capacitor 213 discharges, generating a large reverse polarity pulse across controlled rectifier 63, terminating conduction through that rectifier. The controlled rectifiers 111 and 112 need not be of large capacity since they carry only the capacitor current.

A variable width pulse generator suitable for use in the power supply of FIG. 4 and using fewer load carrying controlled rectifiers is shown in FIG. 21. A pair of controlled rectifiers 113 and 114 have their cathodes connected together and to the negative side of a source of direct current such as the full wave rectifier 41 of FIG. 4. The anodes of the rectifiers 113 and 114 are connected to the opposite ends of the primary of an output transformer 123. The positive side of the direct current source is connected through another controlled rectifier 115 and a choke 127 to a center tap on the primary of the transformer 123, applying direct potential across both of the rectifiers 113 and 114 through adjacent halves of the primary of the output transformer 123. A series circuit of a capacitor 122 and the primary 124 of a transformer 121 is connected between the anodes of the controlled rectifiers 113 and 114 in parallel with the primary of transformer 123. A secondary 125 of the transformer 121 is connected on one side to the cathode of a diode 118, the anode of which is connected to the anode of the controlled rectifier 115, and on the other side to one side of a capacitor 116, the other side of which is connected to the cathode of the controlled rectifier 115. Another secondary 126 of the transformer 121 is connected on one side to the cathode of a diode 119, the anode of which is connected to the anode of the controlled rectifier 115, and on the other side to one side of a capacitor 117, the other side of which is connected to the cathode of the controlled rectifier 115. The variable width pulse output is derived from the secondary of the output transformer 123.

The operation of the generator of FIG. 21 is explainable by reference to FIGS. 22–26. The circuit of FIG. 21 is energized by direct current, and positive pulses are applied to the control electrodes of controlled rectifiers 115 and 113. Current then flows, as shown in FIG. 22, from the positive direct current terminal, through controlled rectifier 115, choke 127, the upper half of the primary of transformer 123, controlled rectifier 113 to the negative side of the direct current source. A positive pulse is generated in the secondary of the output transformer 123. In addition to generating the positive output pulse, current flow through the upper half of the primary of transformer 123 also induces approximately twice the input potential E, across the entire primary. This causes current to flow through the capacitor 122 and the primary of transformer 121 until the capacitor 122 is charged to about 2E. Current flowing through the primary 124 induces a potential in each of the secondaries 125 and 126, but due to the directions in which the diodes 118 and 119 are connected, current flows only through the secondary 126, diode 119 and capacitor 117. Capacitor 117 charges with the polarity shown in FIG. 22, finally terminating conduction through the diode 119 and secondary 126 when the capacitor 117 is fully charged. This state is shown in FIG. 23.

To terminate the generation of the positive pulse in transformer 123, a positive potential is applied to the control electrode of the controlled rectifier 114, causing that rectifier to conduct. The capacitor 122 applies a reverse potential to rectifier 113, thus extinguishing it. Since the capacitor 122 was charged by the double potential produced across the primary of the transformer 123, the reverse potential applied across the controlled rectifier 113 to extinguish it is somewhat greater than the forward potential applied, although the presence of the choke 127 prevents the rapid build-up of the full double voltage. Since the current flowing through controlled rectifier 114 is through the capacitor 122, when that capacitor has charged in the opposite direction, current ceases to flow. In the meantime, however, the current flowing through the controlled rectifier 114 and the capacitor 122 also flows through the primary 124, inducing potentials in the secondaries 125 and 126. Current flows through secondary 125, diode 118, and capacitor 116 as shown in FIG. 25 opening rectifier 115. This charges the capacitor 116 as shown, preparing the circuit for the next step in the operation. When capacitor 116 is charged, controlled rectifier 114 opens as shown in FIG. 26.

The negative pulses are generated in a similar manner except that controlled rectifiers 114 and 115 are triggered on to start conduction through the lower half of the primary of the transformer 123. This generates the negative pulse in the secondary. To terminate the negative pulse, the controlled rectifier 113 is rendered conductive, allowing the capacitor 122 to discharge therethrough, and applying a pulse of reverse potential to the controlled rectifier 114 to terminate conduction therethrough.

The power supply of this invention is particularly useful for providing suitable operating potentials and currents from the newer sources of electrical energy such as the direct conversion fuel cells in which electrical energy is generated directly by the oxidation of the fuel. These direct generating sources produce large direct currents, but at very low potentials, and, for most applications, it is necessary to modify the voltage of the source to that suitable for the load. This usually means conversion to alternating energy for transforming to higher voltages, and, in many cases, reconversion to unidirectional energy.

The circuit of FIG. 27 provides a direct voltage doubler input to the variable width pulse generator. The pulse generator comprises only four controlled rectifiers 128, 129, 130 and 131 in individual arms of a bridge circuit. A capacitor 132 is connected across one diagonal of the bridge, and direct energy, from any convenient source such as a full wave voltage doubler energized by a source of alternating current with one side grounded, or the like, is applied across capacitors 133 and 135 to the other diagonal of the bridge. The pulse output is taken from the secondary of a transformer 134. The capacitors 133 and 135 are each connected from one of the input lines from the source of direct energy to ground, and the primary of the transformer 134 also has one side grounded, the other side being connected to one end of the one diagonal.

The operation of the circuit is explained with the aid of the diagrams of FIGS. 28–32. Initiation of the generation of a pulse is achieved by applying a positive potential to the control electrodes of the controlled rectifiers 128 and 131 in any suitable manner, such as described above. Conduction is then established from the positive input line, through the rectifier 128, the primary of the transformer 134, and ground across capacitor 133 which is connected between the positive input line and ground. At the same time, current flows through the rectifier 128, the capacitor 132, rectifier 131 and the negative input line to charge the capacitor 132. When the capacitor 132 charges to the polarity shown in FIG. 29, conduction in that path ceases, as shown in FIG. 29, and conduction continues through the main path only. The capacitors 133 and 135 are made so large that the time constant of either of these capacitors with the load is greater than the maximum duration of the pulse output. Therefore, conduction through the capacitor 133 continues until it is desired to terminate conduction in the circuit. When this time arrives, a positive potential is applied to the control electrode of the control rectifier 130, and conduction through that rectifier is initiated. As shown in FIG. 30, the capacitor 132 discharges through the control rectifiers 128 and 130, causing a reverse current flow through the rectifier 128 and terminating conduction through that rectifier. Conduction continues through the control rectifier 130, capacitor 132 and the primary of the transformer 134 as shown in FIG. 31 until the capacitor 132 is fully charged in the opposite polarity, then conduction in the entire circuit ceases. This is shown in FIGS. 31 and 32. To generate the pulse of the opposite polarity, the controlled rectifiers 130 and 129 are fired, permitting current to flow from the negative input line, across capacitor 133 to ground and from ground upwardly through the primary of transformer 134 and through controlled rectifier 129 to the negative line. Flow through the controlled rectifier 130 and capacitor 132 continues only until the capacitor 132 is charged to the sum of the positive and the negative input potentials, and then current flow through rectifier 130 ceases. To terminate the generation of the second pulse, the rectifier 131 is fired, causing the capacitor 132 to discharge through the rectifier 131 and, in the reverse direction, through rectifier 129, terminating conduction through that rectifier.

As indicated above, the width of the output pulses from the pulse generators disclosed is generally determined by controlling the time interval between the time the generation of the pulse begins to the time one of the conducting rectifiers is to have its flow of current terminated. This is more clearly illustrated in FIG. 33 in which the generator comprises a bridge having one of controlled rectifiers 136, 137, 138 and 139 in each of its arms. Direct current is supplied to the bridge across one of its diagonals from any convenient source such as the full wave rectifier 41 of FIG. 4. The primary of an output transformer 144 is connected across the other diagonal of the bridge. In parallel with the direct current input is a series arrangement of two controlled rectifiers 141 and 142 used to terminate the generation of the output pulses. A capacitor 143 is connected from the junction of the two controlled rectifiers 141 and 142 to one side of the primary of transformer 144, and a pulse width timing circuit 146 is connected from the same side of the primary of the transformer 144 to the negative input terminal. A second pulse width timing circuit 145, identical to the circuit 146, is connected from the other side of the primary of the transformer 144 to the negative input line and comprises a diode 148 in series with two parallel circuits. One of the parallel circuits comprises a potentiometer 151 and a capacitor 152 in series, and the other parallel circuit comprises a resistor 150 and a diode 149 in series. Connected from the junction of the resistor 150 and the diode 149 is a series arrangement of the two bases of a unijunction transistor and the primary of a transformer 154. The emitter electrode of the transistor is connected to the junction of the potentiometer 151 and the capacitor 152.

The operation of this generator is similar to the operation of the generator of FIG. 18. To generate pulses, two controlled rectifiers, for example rectifier 137 and 138, in the bridge, and one of the turn-off rectifiers, 141 in this case, are turned on by the application of positive potentials to their control electrodes. Conduction is thereby established from the positive input line, through rectifier 137, the primary of the transformer 144 and rectifier 138 to the negative input line. At the same time, current also flows through the rectifier 141, the capacitor 143 and the rectifier 138 to the negative input line to charge the capacitor 143. Once the capacitor 143 is charged, however, conduction through the rectifier 141 ceases. The output pulse is generated in the secondary of the transformer 144 when current flows through its primary. When rectifier 138 conducts, the top side of the primary of transformer 144 is at essentially the same potential as that of the negative input line, since the voltage drop across the rectifier 138 is in the neighborhood of 1-2 volts and almost all of the voltage drop appears across the primary of the transformer 144. Therefore, virtually the entire voltage drop across the load as represented by the primary of transformer 144 is also applied across the diode 148 in the timing circuit 145, causing that diode to conduct. Current flows from one side of the primary of transformer 144, through diode 148, potentiometer 151 and capacitor 152 to the negative input line. When the capacitor 152 has charged to a sufficient potential, the transistor 153 becomes conductive and the capacitor 152 discharges through the transistor 153 and the primary of the transformer 154, inducing a potential in the secondary of the transformer 154. This potential is applied to the control electrode of the controlled rectifier 142, permitting that rectifier to conduct. The capacitor 143 discharges through the rectifiers 142 and 138, driving a current in the reverse direction through rectifier 138 and terminating the conduction therethrough. Current continues to flow from the positive input line, through the rectifier 137, the primary of transformer 144, capacitor 143 and rectifier 142 until the capacitor 143 is charged to the reverse polarity, and then all conduction in the circuit ceases. In the same manner, the output pulse of the opposite polarity is generated by turning on the controlled rectifiers 136 and 139. This applies the full load potential across the timing circuit 146, and rectifier 141 is rendered conductive after a period of time. The discharge of capacitor 143 through rectifiers 141 and 136 drives reverse current through rectifier 136 to terminate conduction therethrough.

From the above description of the operation of the generator, it can be seen that the width of the output pulses are determined by the time required for the capacitor 152 in the timing circuit 145 and its counterpart in circuit 146 to charge through the potentiometers to a potential necessary to render the unijunction transistors conductive. Although the timing circuits can be made similar with care in the choice of the components, they will almost never be identical. Therefore, in most generators using two separate timing circuits for determining the width of the output pulses, there is a difference in the widths of the positive and the negative pulses. When such a difference in the width of the pulses occurs, even though the height of the pulses is the same, a resultant direct current will always flow in the primaries of any transformers carrying the pulses. Even a small amount of residual direct current will increase the magnetizing current in the iron and decrease the effectiveness of the transformer. To overcome this, larger transformers would be necessary. In addition, the difference in the widths of the positive and negative pulses increase the ripple in the resulting direct current, and necessitates the provision of larger and more effective filters, increasing the size and weight of the equipment and the cost of the entire power supply.

The timing circuit of FIG. 34 avoids some of the disadvantages just mentioned. In FIG. 34 a pulse generator similar to that of FIG. 6 is illustrated. The generator comprises controlled rectifiers 155, 156, 157 and 158 connected in the form of of a bridge with a capacitor 159 connected across one diagonal of the bridge and the primary of an output transformer 161 connected between the anodes of rectifiers 156 and 158, which are in adjacent arms. Direct current is supplied to the circuit from any suitable source, such as the full wave rectifier 41 of FIG. 4, by a positive line which is connected to a tap on the primary of the transformer 161 and a negative line which is connected to the junction of the cathodes of the rectifiers 155 and 157, which form the other two arms of the bridge. A diode 162 has its anode connected to one side of the primary of the transformer 161 and its cathode connected to the cathode of a diode 163, which has its anode connected to the other side of the transformer primary, and to the anode of a zener diode 164. The cathode of the diode 164 is connected through a pair of parallel circuits to the negative input line. One of the parallel circuits comprises the series arrangement of a potentiometer 165 and a capacitor 166, and the other parallel circuit comprises a resistor 160 and a diode 170. The junction of the resistor 160 and the diode 170 is connected to one of the bases of a unijunction transistor 167, the other base of which is connected through the primary 169 of a transformer 168 to the negative input line. The junction of the potentiometer 165 and the capacitor 166 is connected to the emitter electrode of the transistor 167.

In operation, the controlled rectifiers 155 and 156 are fired, establishing conduction from the positive input line, through rectifiers 156 and 155 to the negative input line. Conduction through the rectifiers 155 and 156 places the top side of the primary of the transformer 161 at almost the same potential as the negative input line, since the total voltage drop across the two rectifiers 155 and 156 is only about 2-4 volts. This places almost twice the potential across the diodes 163 and 164. Since current flows through only one half of the primary of the transformer 161, the potential induced across the entire primary is approximately twice that of the input. Conduction is therefore established through the diode 163, diode 164, potentiometer 165 and capacitor 166 to charge that capacitor. When the potential across the capacitor 166 reaches a value sufficient to render the transistor 167 conductive, the capacitor 166 discharges through the transistor 167 and the primary 169 of the transformer 168. This induces positive pulses in both of the secondaries 171 and 172 for application to the control electrodes of the rectifiers 155 and 157. Controlled rectifier 155 is already conducting and is not therefore affected, but rectifier 157 is turned on, providing a path for the discharge of the capacitor 159 through rectifiers 157 and 155, driving reverse current through rectifier 155 and terminating conduction therethrough.

The single timing circuit of FIG. 34 operates the same for each pulse generated by the circuit, regardless of the polarity. It operates at about twice the frequency of the earlier described circuits which are individual to the pulses of only one polarity. The detailed operation of the generator of FIG. 34 was explained in the description of FIG. 6 and will not be repeated here. However, it should be noted that the operation of the generator of FIGS. 6 and 34 is such that when the pulses generated by the timing circuit are applied to the two controlled rectifiers, no adverse effects occur since one of the two rectifiers is already conducting. However, in the generator shown in FIGS. 18 and 33, the use of the single timing circuit of FIG. 34 would not operate properly. The two simultaneously generated timing pulses would turn on both rectifiers 141 and 142 (in FIG. 33), short-circuiting the input. However, the variation of the single timing circuit illustrated in FIG. 35 may be used with the generators of FIGS. 18 and 33.

In FIG. 35 only the timing circuit has been shown, the connection of that timing circuit to the pulse generator being the same as the timing circuit shown in FIG. 34. In addition, since the timing circuits of FIGS. 34 and 35 are so similar, the same reference characters have been used for the same elements in both figures. The cathode of zener diode 164 is connected to the two sides of the primary of the output transformer as shown in FIG. 34, and the anode of the diode 164 is connected to two parallel circuits. One of the parallel circuits comprises the series arrangement of a potentiometer 165 and capacitor 166, and the other comprises the series arrangement of a resistor 160 and a diode 170. One base of the unijunction transistor 167 is connected to the junction of the resistor 160 and the diode 170 and the other base is connected through the primary of a transformer 175 to the negative input line. The emitter electrode of the transistor 167 is connected to the junction of the capacitor 166 and the potentiometer 165. The output from the single secondary of the transformer 175 is applied to the input of a binary counter, shown here only as a block. The binary counter has two separate outputs, one for each of its stable states.

In operation, whenever there is conduction in the main path of the generator, a high potential is applied across the diode 164, which is a zener diode, causing the diode to conduct in the reverse direction. Current then flows through the diode 164, the potentiometer 165 and the capacitor 166 to charge the capacitor. When the capacitor 166 charges to a potential sufficient to turn on the transistor 167, capacitor 166 discharges through the transistor 167 and the primary of the transformer 175. A pulse is induced in the secondary of the transformer 175 and is applied to the input of the binary counter to change the state of the counter. A binary counter is a bistable device whose output state is changed to the other of two conditions for each pulse applied to its input. Once the system has been synchronized, the binary counter supplies the positive timing pulse to the appropriate controlled rectifier each time a new output pulse is generated. One of the outputs from the binary counter is connected to the control electrode of one of the turn off rectifiers, and the other output from the binary counter is connected to the control electrode of the other turn off rectifier. The single timing circuit of FIG. 35 can be used with any of the pulse generators, and since the width of the output pulses is determined by the time constant of the same potentiometer-capacitor combination, the widths of all of the output pulses will be the same.

Hereinabove, many of the circuits described have had the advantage of reducing the size, the weight, or both, of the transformers used to carry the load current. As explained above, any reduction in the size and weight of the power transformer, increases the versatility of the circuit by allowing its use in smaller and more mobile installations and remove some of the limits on the efficiency and capacity of the power supply. A transformerless pulse generator for a power supply is illustrated in FIG. 36. The pulse generator comprises a pair of serially connected controlled rectifiers 176 and 177 connected across input lines from a source of direct current, such as the full wave rectifier 41 of FIG. 4. A third controlled rectifier 178 is connected in series with the positive D.-C. line and feeds a load 183 through a filter which comprises a series choke 181 and a parallel capacitor 182. A communicating capacitor 179 is connected from the cathode of the controlled rectifier 178 to the junction of the other two controlled rectifiers 176 and 177. A branch circuit comprising serially connected resistor 184 and diode 185 is connected across the D.-C. input lines. Energy is supplied to the timing circuits from a line 190 which is connected to the junction of the diode 185 and the resistor 184. A capacitor 186 is connected from the line 190 to the negative input line. In addition, two similar circuits, one comprising the series arrangement of a resistor 203, the bases of a unijunction transistor 194 and the primary 192 of a pulse transformer 191, and the other comprising the series arrangement of resistor 204, the bases of a unijunction transistor 202 and the primary 198 of a pulse transformer 197, and another branch, consisting of a resistor 195 and a capacitor 196 in series, are connected in parallel with capacitor 186 from the line 190 to the negative input line. In addition, a serially connected potentiometer 187 and capacitor 188 are connected from the load side of the controlled rectifier 178 to the negative input line, with the junction of the potentiometer 187 and the capacitor 188 connected to the emitter electrode of the unijunction transistor 194. The junction of the resistor 195 and the capacitor 196 is connected to the emitter electrode of the transistor 202. The single secondary 193 of the pulse transformer 191 is connected to the control electrode and the cathode of the controlled rectifier 176, while one secondary 199 of the transformer 197 is connected to the control electrode and cathode of the controlled rectifier 177 and the other secondary 201 of the transformer 197 is connected to control electrode and the cathode of the controlled rectifier 178.

A diode 205 is connected across the output of the pulse generator with its cathode connected to the junction of the cathode of the controlled rectifier 178 and a filter choke 181. A filter capacitor 182 and a load 183 are connected across the output of the power supply.

Figure 38:
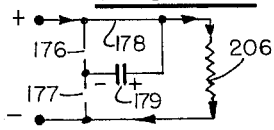
Figure 39:
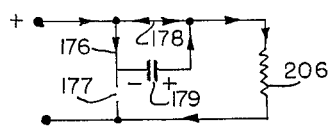
Figure 40:
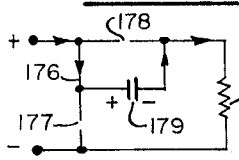
Figure 41:
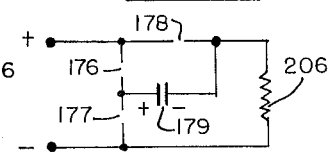
Figure 42:
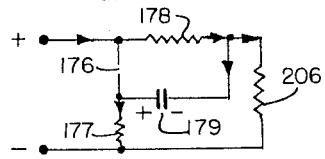

The operation of the circuit is perhaps better understood from a review of FIGS. 37–42 which illustrate the conduction paths through the three controlled rectifiers 176, 177 and 178 and the commutating capacitor 179 during the different stages of the operation. The circuit of FIG. 36 can be started at any time with any or no charge on the capacitor 179 without adverse effects. To initiate the generation of output pulses, the controlled rectifiers 177 and 178 are fired. Conduction then proceeds from the positive input line, through the controlled rectifier 178 and to an external circuit, represented only as resistor 206, to the negative input line as shown in FIG. 38. In addition, current also flows through the controlled rectifier 178, capacitor 179 and controlled rectifier 177 to charge the capacitor. When the capacitor 179 is charged, conduction through the rectifier 177 ceases. This is shown in FIG. 38. To terminate the pulse, controlled rectifier 176 is fired, allowing the capacitor 179 to discharge through both the rectifier 176 and the rectifier 178, and driving current through the rectifier 178 in the reverse direction to terminate conduction therethrough. However, conduction continues from the positive input line through the controlled rectifier 176 and the capacitor 179 to the load and the negative input line until the capacitor 179 has charged in the opposite direction. Then all conduction ceases. These two stages are shown in FIGS. 40 and 41. FIG. 42 shows the initiation of another cycle by the turning on of the controlled rectifiers 178 and 177.

When D.-C. voltage is applied to the circuit, the capacitor 186 charges through the resistor 184 raising the voltage of the line 190 toward the applied positive potential. As the capacitor 186 charges, the capacitor 196 also charges through the additional resistor 195. When the potential of the capacitor 196 reaches a value sufficient for the transistor 202 to become conductive, the capacitor 196 discharges through the transistor 202 and the primary 198 of the transformer 197. This induces potentials in both of the secondaries 199 and 201 of the transformer. These potentials are applied at the same time to the control electrodes of the controlled rectifiers 177 and 178 to initiate the operation of the circuit. Once conduction has started, the potential at the cathode of the controlled rectifier 178 becomes essentially that of the positive input line, and the input potential is applied across potentiometer 187 and capacitor 188. The capacitor 188 begins to charge, and when the voltage across the capacitor 188 reaches the value sufficient to cause transistor 194 to conduct, the capacitor 188 discharges through the transistor 194 and the primary 192 of the transformer 191. This induces a potential in the secondary 193 of the transformer. The secondary voltage is applied to the control electrode of the controlled rectifier 176 to initiate conduction therethrough. This begins the termination of the generation of the pulse. In the meantime, once the capacitor 186 has charged sufficiently, the zener diode 185 breaks down, and maintains an essentially constant voltage, allowing the turn-on pulse times to be less dependent upon the line voltage.

It becomes clear from the above explanation that pulses of only one polarity are generated in the output. During the time that the controlled rectifier 178 is nonconductive, current circulating in the filter may pass through the diode 205. The circuit of FIG. 36 is suitable for use only in those situations where the load voltage is less than the original D.-C. line voltage. Of course, the direct current applied to the circuit may be rectified commercial alternating current from commercial mains or may be rectified higher voltage three phase current. There are many applications for the output of the power supply of FIG. 36, such as the supplying of direct current for transistor or vacuum tube amplifiers, the charging of storage batteries, and other systems.

In addition to the voltage doubler circuit illustrated in FIG. 27 and the transformerless circuit shown in FIG. 36, the power supply of FIG. 43 combines both features and comprises essentially three separate units, an input voltage doubler circuit 208 fed from A.-C. source and supplying direct current, a variable width pulse generator 209 and a D.-C. output voltage multiplying circuit 210. Alternating current is supplied from any suitable source to a pair of input terminals 207, one of which may be grounded, as shown. A full wave rectifier, which may also be considered as two half wave rectifiers connected as a voltage doubler, comprises a bridge having suitable rectifiers 211, 212, 213 and 214 distributed in its arms. The direct current output is taken from the bridge through a pair of choke input filters, one of which comprises a choke 215 and a capacitor 218 and the other of which comprises a choke 216 and a capacitor 219. The chokes 215 and 216 are wound upon similar cores 217 and are each in series with one of the lines connecting the output from the full wave rectifier to the input of the pulse generator 209. The capacitors 218 and 219 are individually connected from the outputs of the chokes 215 and 216 to ground. The variable width pulse generator comprises a bridge having a controlled rectifier 221, 222, 223 and 224 in each of its arms and a capacitor 225 connected as one diagonal. This pulse generator is shown in FIGS. 27-32 with a transformer output. However, in the power supply of FIG. 43, the output is taken directly from one side of the other diagonal and ground through a capacitor 226. Since the output from the pulse generator 209 is alternating, the generator output is rectified by a diode 227 connected between the output line and ground and filtered by a capacitor 228 also connected between the output line and ground. The D.-C. output appears at output terminals 229. This circuit operates as a half wave voltage doubler.

In operation, an alternating current is supplied to the input terminals 207 for application the voltage doubling rectifier comprising the diodes 211, 212, 213 and 214. The input to the rectifier bridge is applied across one diagonal, and the output is taken across the other diagonal. In each of the output lines is a series choke, 215 and 216, forming, together with the capacitors 218 and 219 which are connected from the outputs of the chokes to ground, a combined filter and voltage doubling circuit. The voltage doubler operates the same as the classical voltage doubler in that ground is connected as a third line lying in potential midway between the two output lines from the rectifier. This means that conduction on one half cycle charges capacitor 218 with the ground side negative and on the other half cycle charges the capacitor 219 with the ground side positive. Since the ground side of the two capacitors must be at the same potential, the "hot" sides of the capacitors lie at about the same potential from ground, the "hot" side of capacitor 218 being positive and the "hot" side of capacitor 219 being negative. The total potential difference between the "hot" sides of the two capacitors is about double that of the input potential. Since the capacitors are charged independently of each by alternate half cycles, a single filter choke, to be effective, must be either in the ground circuit or in the output from the filter. Since it is preferable to provide choke input filters, each output line from the rectifier should have its own choke in order to provide adequate filtering action. The direct current output from the filter and voltage doubler 208 is applied across one diagonal of the bridge formed of the controlled rectifiers 221, 222, 223 and 224. The operation of the pulse generator has been explained in detail above, and, therefore, only a brief description will be again presented here. Controlled rectifiers 222 and 223 are first fired, allowing current to flow from the positive input line through rectifier 222, the output filter and load to ground, and from rectifier 222 through the capacitor 225 and rectifier 223 to the negative input line. Capacitor 225 is then charged with its left side negative, and current flows through the capacitor 226 and the diode 231 to the load. To terminate the generation of the pulse being generated, rectifier 221 is fired. When current flowed through the rectifier 222, it also flowed through the capacitor 225. The firing of rectifier 221 permits the capacitor 225 to discharge through rectifier 221 in the forward direction and through rectifier 222 in the backward direction. This extinguishes rectifier 222. Current continues to flow through rectifier 221, capacitor 225 and the load until capacitor 225 is fully charged in the opposite direction, when all conduction in the circuit ceases. Rectifiers 221 and 224 are then fired, permitting current to flow from the positive input line, through rectifier 221 through capacitor 225, and through the rectifier 224 to the negative input line. At the same time, power flows through capacitor 219, through the rectifier 224, and into the capacitor 226, through the rectifier 227, thus charging voltage doubler circuit. The capacitor 226 is charged with the side closest to the pulse generator negative. Thus, a positive and a negative pulse are generated by the generator 209 with the width of the pulses being controlled by the termination circuits as discussed above. The A.-C. output from the pulse generator is rectified, filtered and doubled by the circuit 210.

It is quite clear that the circuit of FIG. 43 can be carried further. One such extension is illustrated in FIG. 44. The source of alternating current is shown as the Y-connected secondaries 232, 233 and 234 of a three phase transformer which has the neutral point 235 grounded. Each phase is connected between a pair of similarly poled diodes 236-237, 238-239 and 241-242. The output from the full wave rectifier formed by the three pairs of diodes is applied to a variable width pulse generator 209 through a filter having chokes 243 and 244 as in FIG. 43. The output from the generator 209 is applied to a voltage multiplying circuit comprising two chains of serially connected capacitors 246 and 247 separated by diodes 248 which are each connected from the junction of two capacitors in one chain to the junction of two capacitors in the other chain.

The operation is the same as the circuit of FIG. 43. The three phase alternating current is rectified by the full wave rectifier formed by the diodes 236-237, 238-239, and 241-242 and filtered in the choke input filter formed by the chokes 243 and 244 and any appropriately connected capacitors (not shown). The pulse generator 209 is shown only as a block, and its operation is exactly the same as the generator 209 of FIG. 43, explained above. The output from the generator 209 is applied to the voltage multiplying circuit where it charges the capacitors through the adjacent diodes 248 so that each adjacent capacitor 246 from 209 has the output potential appearing across it. The total effect is to charge the capacitors in parallel and to recover the voltage in series, effectively multiplying the output potential of 209, which appears at output terminals 249.

Heretofore, several different power supplies have been disclosed using controlled semiconductor rectifiers and various timing circuits. Lest the impression be given that this invention is limited to the use of such controlled rectifiers, FIG. 45 illustrates a power supply in which the variable width pulse generator comprises transistors. Alternating current from any suitable source is applied to input terminals 251, to one of which is connected one side of an alarm 253, the other side of the alarm being grounded. The terminals 251 are connected through suitable input power switches 252 to the input of a full wave rectifier 41 comprising a bridge having suitable diodes 254, 255, 256 and 257 in its individual arms. The D.-C. output from the rectifier 41 is filtered in a filter 40 comprising a series choke 258 and a shunt capacitor 259, and is then applied to the input of a variable width pulse generator 43. The pulse generator 43 comprises transistors 261, 262, 263 and 264 arranged in the form of a bridge with the input from the filter 40 connected across one diagonal and the pulse output taken across the other diagonal. The output from the pulse generator is coupled through a transformer 272 to a full wave rectifier 44 comprising suitable diodes 273, 274, 275 and 276 arranged in the form of a bridge. The rectified output from the full wave rectifier 44 is filtered by a filter 45 comprising a series choke 277 and a shunt capacitor 278, and appears as a smooth direct current at the output terminals 47.

The overall circuit operates similarly to that of FIGS. 15 and 18. When the A.-C. source is connected to the input terminals 251, unless the terminal to which the alarm 253 is coupled is connected to the grounded side of the source, a circuit is completed through the alarm and it sounds. When the input power switches 252 are closed, the alternating current from the source is applied to the full wave rectifier 41 where it is converted to direct current and passed through the filter 40 to have the ripple removed. A comparatively smooth direct current, unregulated, is applied to the input to the pulse generator 43. Switching signals, which may be timing pulses generated by any of the timing circuits disclosed above or may be a series of A.-C. signals of any suitable waveform generated by a separate source, such as a multivibrator, are applied to input terminals 250 which are connected to the primary 266 of a transformer 265. The four secondaries 267, 268, 269 and 271 of the transformer 265 are individually connected to the base and emitter of the separate transistors 261, 262, 263 and 264. If desired, the signals applied to the input terminals 250 may be rectangular pulses of adjustable width. As shown, the secondaries 268 and 271 are connected to the transistors reversely with respect to the secondaries 267 and 269. Thus, at any time, the base electrodes of only two of the transistors, 261–264 or 262–263, will have positive potentials applied thereto. When a positive potential is applied to the base electrode of any of the transistors 261–264, that transistor conducts. Thus, during one time interval, the transistors 261 and 264 are rendered conductive. Current flows from the positive line from the rectifier 41, through the collector-emitter circuits of transistor 261, through the primary of the transformer 272, and through the collector-emitter circuit of transistor 264 to the negative line from the rectifier 41. Conduction through the transistors 261 and 264 continues only so long as positive potentials are applied to their bases, and transistors 262 and 263 become conductive when the opposite polarity signals are applied to terminals 250, permitting current to flow from the positive input line, through transistor 263, the primary of the transformer 272 and transistor 262 to the negative input line. Thus, the flow of current through the primary of the transformer 272 during the second portion of the cycle is in the direction opposite to that of the flow during the first portion of the cycle. Two output pulses of opposite polarity are thereby generated in the secondary of the transformer 272. These pulses are then rectified in the full wave rectifier 44 and filtered in the filter 45 to provide the output terminals 47 with a smooth direct current.

As in the power supplies described earlier, the output potential at the terminals 47 is determined by the width of the pulses generated in the pulse generator 43. The width of the pulses generated is, in turn, dependent upon the times that the transistors are conductive, and that is determined by the width of the signals applied to the input terminals 250. Therefore, by controlling the time during which the timing signals applied to input 250 are of the potential and polarity to render the transistors conductive, the potential of the direct current output at output terminals 47 may be determined.

In the above specification, a new power supply for supplying either alternating currents or direct currents in controlled output potentials has been described. In essence, the circuits shown and described herein provide means for supplying electrical energy at output potentials which are controllable over a wide range of values by simple and small components, generally a potentiometer or two. By means of the circuits disclosed in this specification, the control of kilowatts of electrical power may be accomplished by electrical elements which, in themselves, use but a few watts. In addition, the power supplies disclosed above are generally more efficient, smaller in physical size, and lighter than power supplies of similar capacities constructed along classical lines. The power supplies of this invention are inherently or easily regulated at any selected output potential and are suitable for supplying controlled energy to loads of any size. In addition, since the recommended load carrying elements are generally solid state devices, the power supplies of this invention require virtually no maintenance and survive a great amount of punishment for a considerable length of time. All in all, the power supplies described and illustrated in this specification provide reasonably small, compact units which operate at high efficiencies without substantial maintenance problems for long periods of time, while providing simple and highly effective means for controlling the output potentials of the supplies over wide ranges of values. It is realized that a reading of this specfication may suggest to those skilled in the art other forms for utilizing the principles of this invention without departing from the spirit thereof and without the exercise of invention thereover. It is, therefore, intended that this invention be limited only by the scope of the appended claims.

What is claimed is:

1. An electrical power supply system for supplying electrical energy at selected potentials within a range of potentials, said supply comprising a pair of input terminals adapted to be directly connected to a ground source of alternating current of a given frequency, rectifier means for converting said alternating current into direct current, controllable switches connected to the output of said rectifier means, means for controlling said switches to render them conductive for variable intervals of time, said switches being connected to conduct alternately to produce output pulses of alternately opposite polarity having a width corresponding to the conducting intervals of the switches and at a substantially higher frequency than said given frequency, rectifier means and filtering means coupled to the output of said switches for converting the alternating output pulses of said switches to a filtered direct current having a magnitude proportional to the widths of the pulses, and a string of semiconductor electrothermal devices connected across said filtering means as a bleeder, said devices using the power bled from the power supply to reduce their temperature and being physically arranged to absorb heat from temperature sensitive elements in said power supply.

2. A D.C. to A.C. converter system comprising: a pair of D.C. input terminals, a load device, a number of unidirectional switch devices at least two of which are main load current carrying devices and each being triggerable into a stable high conductive state where current flows readily only in one direction and which remains in the conductive state until current is interrupted or a D.C. counter voltage opposing such current flow is applied thereto, means connecting a first one of said main load current carrying switch devices in series with said pair of D.C. input terminals and said load device for passing current in one direction therethrough, means connecting the second main load current carrying switch devices in series with said pair of D.C. input terminals and said load device for passing current in the opposite direction therethrough, means for periodically alternately triggering said main current carrying switch devices for causing current to pass through said load device in opposite directions, and means for alternately stopping the conduction of said main current carrying switch devices, said last-mentioned means including a capacitor and means for periodically charging said capacitor to said D.C. counter voltage and for periodically connecting said charged capacitor in parallel conduction stopping relation to the currently conducting switch device and in series relation with said load device and said D.C. input terminals where the voltage on the capacitor is in voltage aiding relation with the D.C. voltage on said D.C. input terminals, whereby the energy stored in said capacitor is discharged through said load device to increase the energy coupled through the load device.

3. The converter system of claim 2 wherein said last-mentioned means comprises a first and a second pair of said unidirectional switch devices, means connecting said capacitor in series between said first pair of switch devices and the resultant series circuit in series with said pair of D.C. input terminals and said load device for reversing the charge on the capacitor to charge it in one direction when said first pair of switch devices are simultaneously conducting, means connecting said capacitor to said first main load current carrying switch device for stopping conduction thereof when said first pair of switch devices are conducting and the capacitor is charged in the opposite direction, means connecting said capacitor in series between said second pair of switch devices and the resultant series circuit in series with said pair of D.C. input terminals and said load device for reversing the charge on the capacitor to charge it in the other direction when said second pair of switch devices are simultaneously conducting, means connecting said capacitor to said second main load current carrying switch device for stopping conduction thereof when said second pair of switch devices are conducting and the capacitor is charged in said one direction, the polarity of the charge on the capacitor each time a capacitor charge reversal operation begins being in voltage aiding relationship with the D.C. voltage on said pair of D.C. input terminals whereby the discharge of the capacitor through the load device increases the energy coupled through the transformer, and sequence triggering means for triggering into said conductive state each half cycle first one of said main load current carrying switch devices for effecting the start of the flow of a load current pulsation through the load device and then, to initiate at a variable instant the end of the current pulsation, one or more of said switch devices to effect simultaneous conduction of the associated pair of switch devices for stopping the conduction of said one main load current carrying switch device and, when the capacitor is fully charged to the new voltage conditions, for terminating the flow of current through said load device until the beginning of the next half cycle.

4. The converter system of claim 3 wherein one of the switch devices of each of said first and second pair of switch devices is a main current carrying switch device which is in series with said load device.

5. A power supply circuit comprising: a pair of D.C. input terminals, an output device, a unidirectional switch device triggerable into a stable high conductive state where current flows readily only in one direction and which remains in the conductive state until a D.C. counter voltage opposing such current flow is applied thereto or the current is otherwise interrupted, means connecting said switch device in series with said pair of D.C. input terminals and said output device for passing current therethrough, means for periodically triggering said switch device into a conductive state for causing current to pass through said load device, means for periodically stopping the conduction of said switch device comprising capacitor means, and switch means for coupling said capacitor means when charged to said D.C. counter voltage across said switch device when in a conductive state for stopping the conduction thereof and in series circuit relation with said output device and said D.C. input terminals for effecting the discharge thereof through said output device.

6. In a D.C. to A.C. power supply inverter circuit including a pair of D.C. input terminals, a load device, a number of unidirectional switch devices at least two of which are main load current carrying devices and each being triggerable into a stable high conductive state where current flows readily only in one direction and which remains in the conductive state until a D.C. counter voltage opposing such current flow is applied thereto, means connecting a first one of said main load current carrying switch devices in series with said pair of D.C. input terminals and said load device for passing current in one direction therethrough, means connecting the second one of said main load current carrying switch devices in series with said pair of D.C. input terminals and said load device for passing current in the opposite direction therethrough, and means for periodically alternately triggering said main current carrying switch devices into a conductive state for causing current to pass through said load device in opposite directions, the improvement comprising means for alternately stopping the conduction of said main current carrying switch devices comprising capacitor means, first switch means for coupling said capacitor means when charged to said D.C. counter voltage simultaneously across said main load current carrying switch devices when it is in a conductive state for stopping the conduction thereof and in series circuit relation with said load device and said D.C. input terminals for effecting first the discharge of the capacitor means through said load device and then the reverse charging of the capacitor means.

7. In a D.C. to A.C. power supply inverter circuit including a pair of D.C. input terminals, a load device, a number of unidirectional switch devices at least two of which are main load current carrying devices and each being triggerable into a stable high conductive state where current flows readily only in one direction and which remains in the conductive state until a D.C. counter voltage opposing such current flow is applied thereto, means connecting a first one of said main load current carrying switch devices in series with said pair of D.C. input terminals and said load device for passing current in one direction therethrough, means connecting the second one of said main load current carrying switch devices in series with said pair of D.C. input terminals and said load device for passing current in the opposite direction therethrough, means for periodically alternately triggering said main current carrying switch devices into a conductive state for causing current to pass through said load device in opposite directions, the improvement comprising means for alternately stopping the conduction of said main current carrying switch devices comprising capacitor means, first switch means for coupling said capacitor means when charged in one direction to said D.C. counter voltage simultaneously across said main load current carrying switch devices when it is in a conductive state for stopping the conduction thereof and in series circuit relation with said load device and said D.C. input terminals for effecting the discharge of the capacitor means through said load device, and second switch means for coupling the capacitor means when charged in the opposite direction to said D.C. counter voltage simultaneously across the other main load current carrying switch device when it is in a conductive state for stopping the conduction thereof and in series circuit relation with said load device and said D.C. input terminals for effecting the discharge of the capacitor means.

8. In a D.C. to A.C. power supply inverter circuit including a pair of D.C. input terminals, a load device, a number of unidirectional switch devices at least two of which are main load current carrying devices and each being triggerable into a stable high conductive state where current flows readily only in one direction and which remains in the conductive state until a D.C. counter voltage opposing such current flow is applied thereto, means connecting a first one of said main load current carrying switch devices in series with said pair of D.C. input terminals and said load device for passing current in one direction therethrough, means connecting the second one of said main load current carrying switch devices in series with said pair of D.C. input terminals and said load device for passing current in the opposite direction therethrough, means for periodically alternately triggering said main current carrying switch devices into a conductive state for causing current to pass through said load device in opposite directions, the improvement comprising means for alternately stopping the conduction of said main current carrying switch devices comprising capacitor means, first switch means for coupling said capacitor means when charged in one direction to said D.C. counter voltage simultaneously across one of said main load current carrying switch devices when it is in a conductive state for stopping the conduction thereof and in series circuit relation with said load device and said D.C. input terminals for effecting first the discharge of the capacitor means through said load device and then the reverse charging of the capacitor means, and second switch means for coupling the capacitor means when charged in the opposite direction to said D.C. counter voltage simultaneously across the other main load current carrying switch device when it is in a conductive state for stopping the conduction thereof and in series circuit relation with said load device and said D.C. input terminals for effecting first the discharge of the capacitor means and then the reverse charging of the capacitor means.

9. A D.C. to A.C. power supply inverter circuit comprising: a pair of D.C. input terminals, a load device, at least six unidirectional switch devices, each having a pair of load terminals and a control terminal, each triggerable by a control voltage on said control terminal into a high conductive state where current flows readily only in one direction therethrough and which remains in the conductive state until a D.C. counter voltage opposing such current flow is applied to said load terminals thereof, four of said switch devices being main load current carrying switch devices and the other devices being primarily control switch devices, means coupling said load device in series between load terminals of a first (1M) and a second (2M) one of said main load current carrying switch devices and the remotest load terminals thereof respectively to said pair of D.C. input terminals for effecting current flow in one direction through said load device when the switch devices are in their conductive state, means coupling said load device in series between load terminals of a third (3M) and fourth (4M) one of said main load current carrying switch devices and the remotest load terminals thereof respectively to said pair of D.C. input terminals for effecting current flow in the other direction through said load device when the latter switch devices are in their conductive states, a capacitor having one of its terminals coupled to the load terminals of the pair (1M and 4M) of main load carrying switch devices which are connected to the same end of said primary winding means, means connecting a first (1C) one of said control switch devices between the other terminal of said capacitor and one of said D.C. input terminals for coupling a forward counter voltage stored on said capacitor across the load terminals of the first (1M) main load current carrying switch devices to terminate the conductive state thereof and first to discharge the capacitor and then charge said capicitor to a reverse counter voltage, means connecting a second (2C) one of said control switch devices between said other terminal of said capacitor and the other of said D.C. input terminal for coupling said reverse counter voltage stored on said capacitor across the load terminals of the fourth (4M) main load current carrying switch device to terminate the conductive state thereof and first to discharge and then to charge said capacitor to said former counter voltage, and means for repeatedly feeding triggering signals to the control terminals of said switch devices to render the same conductive in the following repetitive sequence:

| Time | 1M | 2M | 3M | 4M | 1C | 2C |
|------|----|----|----|----|----|----|
| t1 | X | X |   |   |   | X |
| t2 |   |   |   |   | X |   |
| t3 |   |   | X | X | X |   |
| t4 |   |   |   |   |   | X | where $t1$, $t2$, $t3$ and $t4$ are sequentially related instants of time in the order given and "X" indicates that the switch device involved is triggered into a conductive state at the instant involved.

10. The inverter circuit of claim 9 wherein there is provided regulating means responsive to the output of the inverter circuit for varying the spacing between $t1$ and $t2$ and between $t3$ and $t4$.

11. A D.C. to A.C. power supply converter system comprising: a pair of D.C. input terminals, an output transformer having a primary and a secondary winding and a variable width pulse supplying circuit connected between said D.C. input terminals and said primary winding for alternately coupling variable width pulses in opposite directions through said primary circuit and including first and second main load current carrying unidirectional switching means, and first and second control unidirectional switching means connected together in the form of a bridge circuit with one of said switching means in each of its arms and the main load current carrying switching means in contiguous arms of the bridge circuit, said D.C. input terminals being connected to said bridge circuit at opposite ends of one diagonal thereof which spans the arms containing the main load current carrying switching means, one end of said primary winding being connected to one side of the other diagonal of said bridge at the junction of said main load current carrying switching means, the other end of said primary winding being connected to a common point, a first capacitor connected from one of said input terminals to said common point, a second capacitor connected from the other input terminal to said common point, a third capacitor connected as the other diagonal of said bridge circuit, and means for alternately causing said main load current carrying switching means to become conductive at the desired A.C. frequency to effect current flow first in one direction through said primary winding and then in the other direction therethrough and to alternately effect conduction of said first and second control switching means at said A.C. frequency to charge said third capacitor alternately in opposite directions, and means for terminating conduction of said first and second main load current carrying switching means comprising means for rendering said first and second control switching means alternately conductive at the desired A.C. frequency for connecting the charged third capacitor in current opposing relation to the conducting main current carrying switching means.

References Cited by the Examiner

UNITED STATES PATENTS

| | | | |
|---|---|---|---|
| 2,682,002 | 6/1954 | Gibson | 321—15 X |
| 2,924,725 | 2/1960 | Blair | 307—88.5 |
| 2,975,353 | 3/1961 | Rockstuhl | 321—2 |
| 3,012,181 | 12/1961 | Schultz | 321—2 |
| 3,022,457 | 2/1962 | Doan | 307—88.5 |
| 3,026,427 | 3/1962 | Chisholm | 307—88.5 |
| 3,040,183 | 6/1962 | Farnsworth | 321—27 |
| 3,062,998 | 11/1962 | Medlar | 320—33 |
| 3,075,136 | 1/1963 | Jones | 323—45 |
| 3,144,873 | 12/1963 | Love | 323—22 |
| 3,219,905 | 11/1965 | Davis et al. | 321—8 |

OTHER REFERENCES

Controlled Rectifier Manual, G. E. Co. 1960, pp. 100–103, TK2798–G4g.

JOHN F. COUCH, *Primary Examiner.*

WALTER L. CARLSON, LLOYD McCOLLUM,
*Examiners.*

D. J. YUSKO, G. GOLDBERG, *Assistant Examiners.*